United States Patent [19]
Watabe et al.

[11] Patent Number: 5,796,936
[45] Date of Patent: Aug. 18, 1998

[54] DISTRIBUTED CONTROL SYSTEM IN WHICH INDIVIDUAL CONTROLLERS EXECUTED BY SHARING LOADS

[75] Inventors: Mitsuru Watabe, Urizura-machi; Hiromasa Yamaoka, Hitachi, both of Japan

[73] Assignee: Hitachi, Ltd., Tokyo, Japan

[21] Appl. No.: 801,923

[22] Filed: Feb. 14, 1997

Related U.S. Application Data

[63] Continuation of Ser. No. 203,295, Mar. 1, 1994, abandoned.

[30] Foreign Application Priority Data

Mar. 1, 1993 [JP] Japan .................................. 5-39643

[51] Int. Cl.⁶ .................................................. G06F 13/00
[52] U.S. Cl. ................................................. 395/182.09
[58] Field of Search ........................ 395/182.09, 182.08, 395/182.02, 182.01, 183.01

[56] References Cited

U.S. PATENT DOCUMENTS 4,482,962  11/1984  Amano et al. ................. 364/431.11
5,031,089  7/1991  Liu et al. ............................ 364/200
5,313,584  5/1994  Tickner et al. ..................... 395/275

*Primary Examiner*—Robert W. Beausoliel, Jr.
*Assistant Examiner*—Norman M. Wright
*Attorney, Agent, or Firm*—Antonelli, Terry, Stout & Kraus, LLP

[57] ABSTRACT

A distributed control system includes a plurality of controllers each composed of a plurality of processors and being coupled through a network. Each controller includes a scheduler for measuring a load; internal backup means for controlling which controller bears the load; backup request means for requesting another controller to bear the load; and backup accept means for answering to a request for bearing the load from another controller in accordance with the load of the requesting controller. Thus, the load which cannot be executed by one controller can be distributed and executed by other controllers in accordance with their loads.

21 Claims, 14 Drawing Sheets

FIG. 7

| EXECUTION SHARING TABLE | | | |
|---|---|---|---|
| MICROCOMPUTER | TASK | LOAD FACTOR (%) | INTERNAL LOAD PRECEDENCE |
| DC1, MC1 | OS11, NC1, CM1, T11 | 72 | 2 |
| DC1, MC2 | OS12, T12, T13, T14 | 81 | 4 |
| DC1, MC3 | OS13, T15, T16 | 75 | 3 |
| DC1, MC4 | OS14, T17, T18 | 57 | 1 |
| DC2, MC1 | OS21, NC2, CM2 | 63 | 3 |
| DC2, MC2 | OS22, T21, T22 | 58 | 1 |
| DC2, MC3 | OS23, T23, T24 | 60 | 2 |
| DC2, MC4 | OS24, T25, T26 | 75 | 4 |
| DC3, MC1 | OS31, NC3, CM3 | 58 | 1 |
| DC3, MC2 | OS32, T31, T32 | 72 | 3 |
| DC3, MC3 | OS33, T33, T34, T35 | 60 | 2 |
| DC3, MC4 | OS34, T36, T37 | 74 | 4 |
| . | . | . | . |
| | ── THE REST IS OMITTED ── | | |
| . | . | . | . |

FIG. 8

| ACCEPTANCE PRECEDENCE TABLE | |
|---|---|
| PRECEDENCE | MICROCOMPUTER |
| 1 | DC1, MC4 |
| 2 | DC2, MC2 |
| 3 | DC3, MC1 |
| 4 | DC2, MC3 |
| 5 | DC3, MC3 |
| 6 | DC2, MC1 |
| . | . |
| ── THE REST IS OMITTED ── | |
| . | . |

FIG. 9

| TASK LOAD TABLE | | | |
|---|---|---|---|
| TASK | LOAD FACTOR (%) | ATTRIBUTE | DOMICILE |
| NC1 | 26 | INTERNALLY | DC1, MC1 |
| CM1 | 28 | INTERNALLY | DC1, MC1 |
| OS11 | 5 | FIXED | DC1, MC1 |
| OS12 | 5 | FIXED | DC1, MC2 |
| OS13 | 5 | FIXED | DC1, MC3 |
| OS14 | 5 | FIXED | DC1, MC4 |
| T11 | 13 | COMMUNICATIVE | DC1, MC1 |
| T12 | 24 | SOMEWHERE | DC1, MC2 |
| T13 | 31 | COMMUNICATIVE | DC1, MC2 |
| T14 | 21 | SOMEWHERE | DC1, MC2 |
| T15 | 28 | SOMEWHERE | DC1, MC3 |
| T16 | 41 | COMMUNICATIVE | DC1, MC3 |
| T17 | 25 | COMMUNICATIVE | DC1, MC4 |
| T18 | 26 | SOMEWHERE | DC1, MC4 |
| NC2 | 27 | INTERNALLY | DC2, MC1 |
| . | . | . | . |
| | | — OMITTED — | |
| . | . | . | . |
| OS22 | 5 | FIXED | DC2, MC2 |
| OS23 | 5 | FIXED | DC2, MC3 |
| . | . | . | . |
| | | — OMITTED — | |
| . | . | . | . |
| T21 | 18 | COMMUNICATIVE | DC2, MC2 |
| T22 | 35 | SOMEWHERE | DC2, MC2 |
| T23 | 23 | COMMUNICATIVE | DC2, MC3 |
| T24 | 32 | SOMEWHERE | DC2, MC3 |
| . | . | . | . |
| | | — OMITTED — | |
| . | . | . | . |
| NC3 | 27 | INTERNALLY | DC3, MC1 |
| CM3 | 26 | INTERNALLY | DC3, MC1 |
| OS31 | 5 | FIXED | DC3, MC1 |
| . | . | . | . |
| | | — THE REST IS OMITTED — | |
| . | . | . | . |

FIG. 11

| ACCEPTING TASK QUEUE | | | | |
|---|---|---|---|---|
| TASK | LOAD FACTOR (%) | ATTRIBUTE | DOMICILE | RESULTS OF SELECTION |
| OS14 | 5 | FIXED | DC1, MC4 | SELECTED |
| NC1 | 26 | INTERNALLY | DC1, MC1 | SELECTED |
| CM1 | 28 | INTERNALLY | DC1, MC1 | SELECTED |
| T11 | 13 | COMMUNICATIVE | DC1, MC1 | UNSELECTED |
| T17 | 25 | COMMUNICATIVE | DC1, MC4 | SELECTED |
| T18 | 26 | SOMEWHERE | DC1, MC4 | EXPELLED |

FIG. 12

| ACCEPTING TASK QUEUE | | | | |
|---|---|---|---|---|
| TASK | LOAD FACTOR (%) | ATTRIBUTE | DOMICILE | RESULTS OF SELECTION |
| OS13 | 5 | FIXED | DC1, MC3 | SELECTED |
| T11 | 13 | COMMUNICATIVE | DC1, MC1 | SELECTED |
| T16 | 41 | COMMUNICATIVE | DC1, MC3 | SELECTED |
| T18 | 26 | SOMEWHERE | DC1, MC4 | UNSELECTED |
| T15 | 28 | SOMEWHERE | DC1, MC3 | SELECTED |

FIG. 13

| ACCEPTING TASK QUEUE | | | | |
|---|---|---|---|---|
| TASK | LOAD FACTOR (%) | ATTRIBUTE | DOMICILE | RESULTS OF SELECTION |
| OS22 | 5 | FIXED | DC2, MC2 | SELECTED |
| T21 | 18 | COMMUNICATIVE | DC2, MC2 | SELECTED |
| T18 | 26 | SOMEWHERE | DC2, MC4 | SELECTED |
| T22 | 35 | SOMEWHERE | DC2, MC2 | SELECTED |

FIG. 14

| EXECUTION SHARING TABLE ||||
|---|---|---|---|
| MICROCOMPUTER | TASK | LOAD FACTOR (%) | INTERNAL LOAD PRECEDENCE |
| DC1, MC1 | DOWN | DOWN | DOWN |
| DC1, MC2 | OS12, T12, T13, T14 | 81 | 1 |
| DC1, MC3 | OS13, T15, T16, T11 | 88 | 3 |
| DC1, MC4 | OS14, NC1, CM1, T17 | 84 | 2 |
| DC2, MC1 | OS21, NC2, CM2 | 63 | 3 |
| DC2, MC2 | OS22, T21, T22 | 58 | 1 |
| DC2, MC3 | OS23, T23, T24 | 60 | 2 |
| DC2, MC4 | OS24, T25, T26 | 75 | 4 |
| DC3, MC1 | OS31, NC3, CM3 | 58 | 1 |
| DC3, MC2 | OS32, T31, T32 | 72 | 3 |
| DC3, MC3 | OS33, T33, T34, T35 | 60 | 2 |
| DC3, MC4 | OS34, T36, T37 | 74 | 4 |
| . | . | . | . |
| . | — THE REST IS OMITTED — | | . |
| . | . | . | . |

 HALFTONE PORTIONS ARE UPDATED

FIG. 15

| ACCEPTANCE PRECEDENCE TABLE ||
|---|---|
| PRECEDENCE | MICROCOMPUTER |
| 1 | DC2, MC2 |
| 2 | DC3, MC1 |
| 3 | DC2, MC3 |
| 4 | DC3, MC3 |
| 5 | DC2, MC1 |
| 6 | DC3, MC2 |
| . | . |
| — THE REST IS OMITTED — | . |
| . | . |

 HALFTONE PORTIONS ARE UPDATED

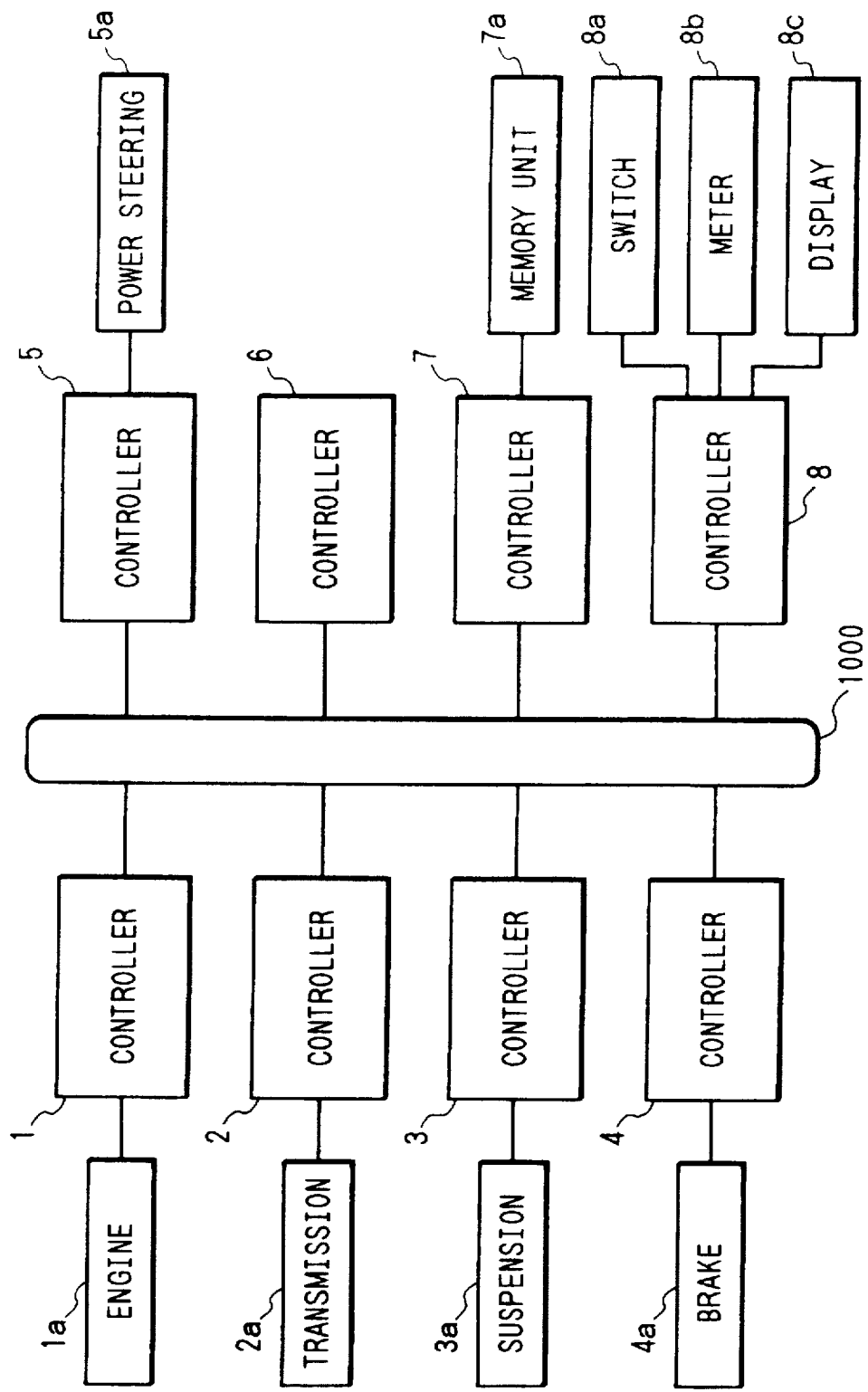

DISTRIBUTED CONTROL SYSTEM IN WHICH INDIVIDUAL CONTROLLERS EXECUTED BY SHARING LOADS

CROSS-REFERENCE TO RELATED APPLICATION

This is a continuation of application Ser. No. 08/203,295 filed on Mar. 1, 1994, now abandoned.

The present invention relates to a distributed or decentralized control system for controlling a plurality of control units (or controllers) in a distributed or decentralized manner for a variety of controls, such as process controls, plant controls or vehicle controls; and, more particularly, to a distributed control system in which individual controllers perform backup operations by sharing the loads without using any backup controller.

In a conventional plant control system, there has been a control system called a "distributed control system" for distributing and controlling a plurality of controllers. In this distributed control system, the plurality of controllers are connected through a network to control power plants, steel rolling plants, elevators or automobiles. This control system is used in either an important plant control system forming the basis of an industry or for controlling a system affecting human lives. In this distributed control system, therefore, it is essential to improve the operating efficiency and the reliability of the system.

In a distributed control system of this type, it is customary that, in case one controller becomes faulty (down), another controller takes charge of (or backs up) the load of the faulty controller. In Japanese Patent Laid-Open Nos. 177634/1987 and 118860/1988, for example, there is disclosed a *concept of preparing a dedicated controller for backing up a faulty controller. In other examples, as in Japanese Patent Laid-Opens Nos. 224169/1990 and 296851/1991, there is disclosed a concept of providing a centralized supervising computer for sharing the load of a faulty computer in accordance with the load situations of individual computers, so that the faulty computer may be backed up by a plurality of other computers in accordance with an instruction issued by the centralized supervising computer.

The former technology requires a dedicated backup controller so that it is uneconomical and disadvantageous for controlling an automobile, because this type of control requires a downsizing of the system. According to the latter technology, on the other hand, since the load distribution is under centralized supervision, the computer system may be halted in its entirety if the centralized supervision computer becomes faulty.

SUMMARY OF THE INVENTION

An object of the present invention is to provide a distributed control system for backing up a controller, which is considered faulty because it has deviated from its normal operation, by decentralizing/distributing the load of the faulty controller autonomously, but without providing a centralized supervision controller or a dedicated backup controller.

In short, the present invention proposes to enhance the synthetic performance of the distributed control system by making effective use of the excess performance of controllers which still provide normal operations. In short, another embodiment of the present invention is to provide a distributed control system for backing up controllers, which are multiplexly faulty, coordinatively by the use of individual controllers.

According to one aspect of the present invention, there is provided a distributed control system including a plurality of controllers, each comprising: detect means for detecting a fault or overload condition in another controller; memory means for detecting and storing the amount of load or task of a controller to be backed up; and backup means for backing up a controller to be backed up, if a fault or overload is detected by the detect means, to specify the faulty or overloaded controller, by distributing and assigning the load or task of the faulty or overloaded controller to the controller to perform the backup.

The aforementioned load memory means may desirably be provided with both an execution sharing table indicating the tasks and load situations being executed by the individual controllers and a task load table indicating the loads when the individual tasks are executed. With these provisions, the priority of controller to perform the backup can be determined on the basis of the task load table. If there is further provided an acceptance precedence table which is stored with the result of determining the priority of the controller to perform the backup on the basis of the task load table, a controller having a margin and which will easily perform the backup can be promptly determined according to the load situations of the individual controllers.

The aforementioned backup means may include: backup request means for requesting another controller for performing a backup; and backup accept means for deciding whether or not the backup is possible in accordance with the acceptance precedence table, to answer the acceptance, if any, and to instruct execution of the accepted task.

According to another embodiment of the present invention, moreover, each controller includes a plurality of processors. In order to improve the fault tolerance and reliability of each controller, therefore, the aforementioned execution sharing table has a region for indicating how each processor in a controller is loaded and what processor has a margin to back up the load. Thus, the backup means has internal backup means for determining a processor to backup the load of the faulty processor in accordance with the execution sharing table and task load table.

Thanks to the execution sharing table, task load table and acceptance precedence table belonging to each controller, according to the distributed control system of the present invention, the task to be backed up and the controller suited for the backup can be retrieved to determine what controller is to have its backup request means used. The load upon the faulty controller can be distributed by informing the determined result to the backup accept means of another controller.

Moreover, the backup accept means of the controller requested for backup is based upon its load as stored in its own execution sharing table to decide by itself whether or not the target task to be backed up can be executed by its own controller, and accepts the target task to be backed up selectively. By broadcasting this result of selection as an acceptance message, the requesting and other controllers correct their execution sharing tables and acceptance precedence tables in a manner to reflect a change in the load situations of the controller performing the backup. Moreover, the requested controller transmits to the requesting controller a target task which is not accepted, but which is to be backed up. Therefore, in accordance with the corrected acceptance precedence table (which will not have the backed-up controller positioned at its head because the load factor is raised), the controller to be newly backed up (or registered in the acceptance precedence table) is requested for those rejected. Thus, according to the present invention, the individual controllers can always grasp the executing situation of the system precisely. Moreover, the controller requested for the backup can reject the request so that the target tasks to be autonomously backed up can be processed in a decentralized/distributed manner.

Even if, furthermore, one of the plurality of processors contained in one controller is faulty, the internal backup means selects a processor having a light load in accordance with the execution sharing table, decides whether or not the selected processor can back up all the loads of the faulty processor, executes the backup such that the processor may not be overloaded, and selects another processor, if a load is left, to cause it to perform the backup. Thus, the internal backup means can distribute the load of the faulty processor such that it is confined in the load limit of each processor so that the individual processors may not be overloaded, but can perform the backup sequentially.

BRIEF DESCRIPTION OF THE DRAWINGS

These and other objects, features and advantages of the present invention will be understood more clearly from the following detailed description with reference to the accompanying drawings, wherein:

FIG. 7 is a diagram presenting one example of the executing sharing table shown in FIG. 1;

FIG. 8 is a diagram presenting one example of the acceptance precedence table shown in FIG. 1;

FIG. 9 is a diagram presenting one example the task load table shown in FIG. 1;

FIG. 11 is a diagram presenting one example of the state in a first internal backup of the accepting task queue shown in FIG. 1;

FIG. 12 is a diagram presenting one example of the state in a second internal backup, as advanced from the state of FIG. 11;

FIG. 13 is a diagram presenting one example of the state in a first external backup of the accepting task queue shown in FIG. 1;

FIG. 14 is a diagram presenting one example of state of the execution sharing table after an internal backup according to the present invention;

FIG. 15 is a diagram presenting one example of the state of the acceptance precedence table after an internal backup according to the present invention;

FIG. 18 is a block diagram showing an embodiment in which the distributed control system of the present invention is applied to the control of an automobile.

DESCRIPTION OF THE PREFERRED EMBODIMENTS

Figure 1:
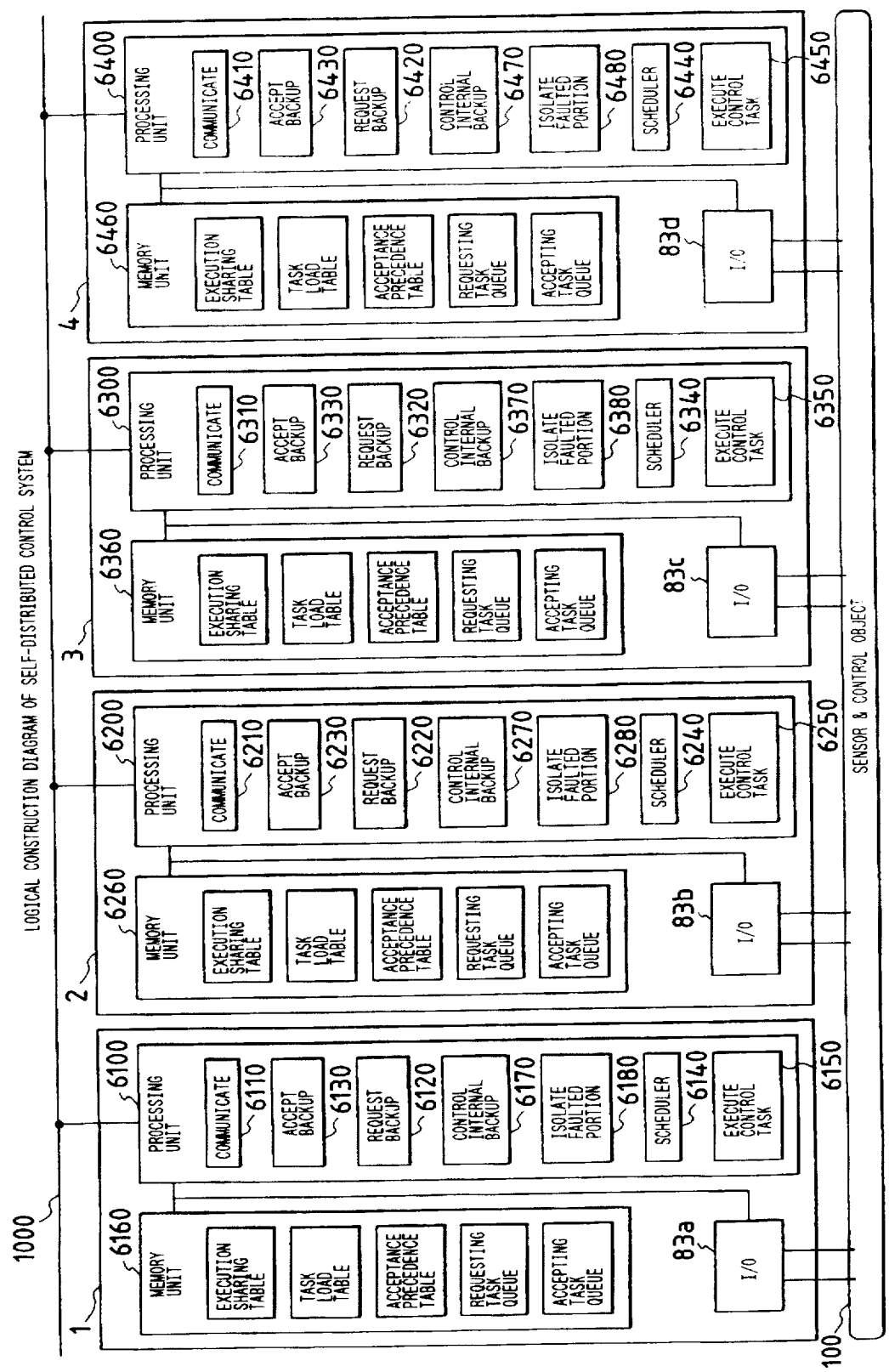
FIG. 1 is a diagram showing a functional construction of a self-distributed control system according to the present invention.

FIG. 1 is a diagram schematically showing a distributed control system of the present invention. The distributed control system is constructed such that, when multiple controllers become faulty, other active controllers distribute the load autonomously and back up the disabled controllers. In FIG. 1, a plurality of controllers 1, 2, 3 and 4 are connected with the sensors and control objects of a plant 100 to control the plant. These controllers 1 to 4 are mutually connected through a network 1000 to constitute a distributed control system. The controllers 1, 2, 3 and 4 are individually constructed to include processing units 6100, 6200, 6300 and 6400, memory units 6160, 6260, 6360 and 6460, and I/Os 83a, 83b, 83c and 83d. Moreover, the controllers 1, 2, 3 and 4 individually execute communications 6110, 6210, 6310 and 6410, backup requests 6120, 6220, 6320 and 6420, backup acceptances 6130, 6230, 6330 and 6430, schedulers 6140, 6240, 6340 and 6440, control task executions 6150, 6250, 6350 and 6450, internal backup controls 6170, 6270, 6370 and 6470, and faulted portion isolations 6180, 6280, 6380 and 6480. Since these individual controllers have similar constructions and execute similar functions, the controller 1 will be taken as an example and described as a representative of the others. Incidentally, each controller is equipped with four microcomputers, as will be described with reference to FIG. 5. Moreover, each microcomputer is equipped with hardware sufficient for providing the individual functions for the communications, backup requests, backup acceptances, internal backup controls, faulted portion isolations, schedulers and control task executions, and is given a processing ability sufficient for executing software (or tasks) for providing the individual functions. Thus, the above specified functions can be executed on any of the microcomputers. These individual functions will be described in the following.

The communication 6110 uses the network 1000 and the memory unit 6160 to execute such message or data exchanges with other controllers as are necessary for the backup request 6120, the backup acceptance 6130, the scheduler 6140, the control task execution 6150, the internal backup control 6170 and the isolation 6180. The scheduler 6140 determines and provides information concerning the sequence and time slot, at which a plurality of tasks registered therein are assigned to the microcomputers. The control task execution 6150 controls the sensors and control objects of the plant 100. The scheduler 6140 and the control task execution 6150 are connected with the memory unit 6160 to supervise the scheduling and the control of the plant 100 on the basis of the tasks, data and scheduling information stored therein. On the other hand, the scheduler 6140 and the control task execution 6150 are connected with the communication 6110 and exchanges messages with other controllers through the communication 6110 and the network 1000 so as to be in synchronization with other controllers.

The functions to supervise the backup operations will be described in the following. The faulted portion isolation 6180 is connected with internal backup control 6170 and the communication 6110. The isolation function is to detect the down condition, such as a fault of the hardware or a runaway of the software in the microcomputer, and to halt the operation of the malfunctioning microcomputer. Similar operations are executed, too, even in case another controller identifies faults in other controllers including itself through the network 1000. The faulted portion isolation 6180 is connected with communication 6110 so that it can start the backup operation in response to the information of faults from other controllers. Moreover, the faulted portion isolation 6180 informs the internal backup control 6170 of what microcomputer has gone down through the aforementioned connection in case it detects faults by itself or in case it is informed of the faults.

The internal backup control 6170 is connected with the communication 6110, the memory unit 6160, the faulted portion isolation 6180 and the backup request 6120. This function backs up tasks which have gone down so that they cannot be executed in the controller in accordance with their priority while following the procedure of FIG. 2, in case the malfunction in the controller is identified from the faulted portion isolation 6180. In order to prevent the extension of a partial malfunction to a disabling of the entire controller, a task having the highest priority is indispensable for supervising the controller. The task given the next priority is one requiring a large amount of communication in the case of backups by other controllers, so that a bottleneck of the communication through the network 1000 may not be created to cause a delay or malfunction of the communication frequently. These backups are executed sequentially from microcomputers having lighter loads to microcomputers having heavier loads. So long as there is a task to be backed up, the load is distributed so that the divided portions are sequentially backed up by a plurality of microcomputers. When the task to be backed up disappears midway, the processing is then ended.

Figure 2:
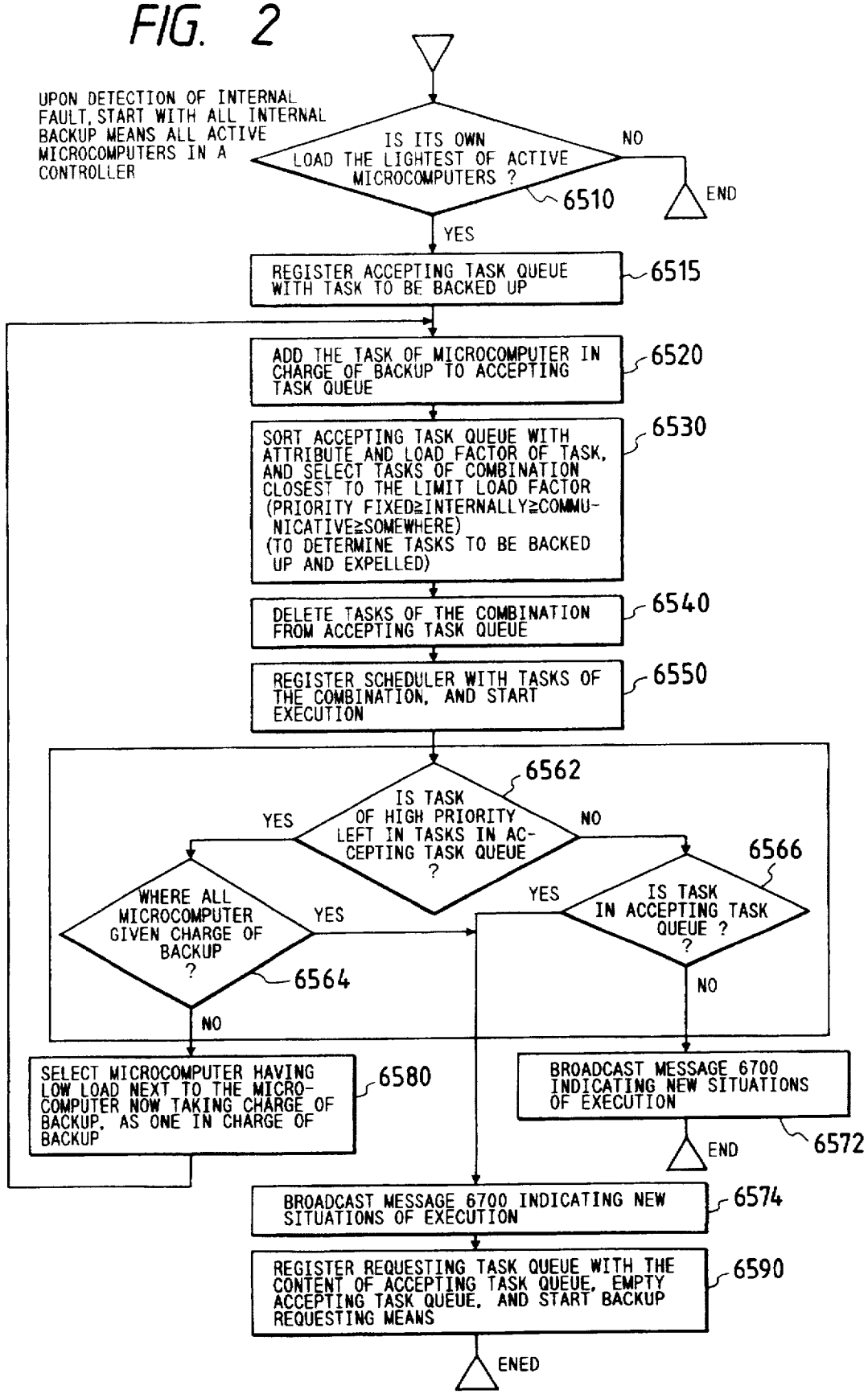
FIG. 2 is a flow chart showing one example of an internal backup procedure of the present invention.
Figure 3:
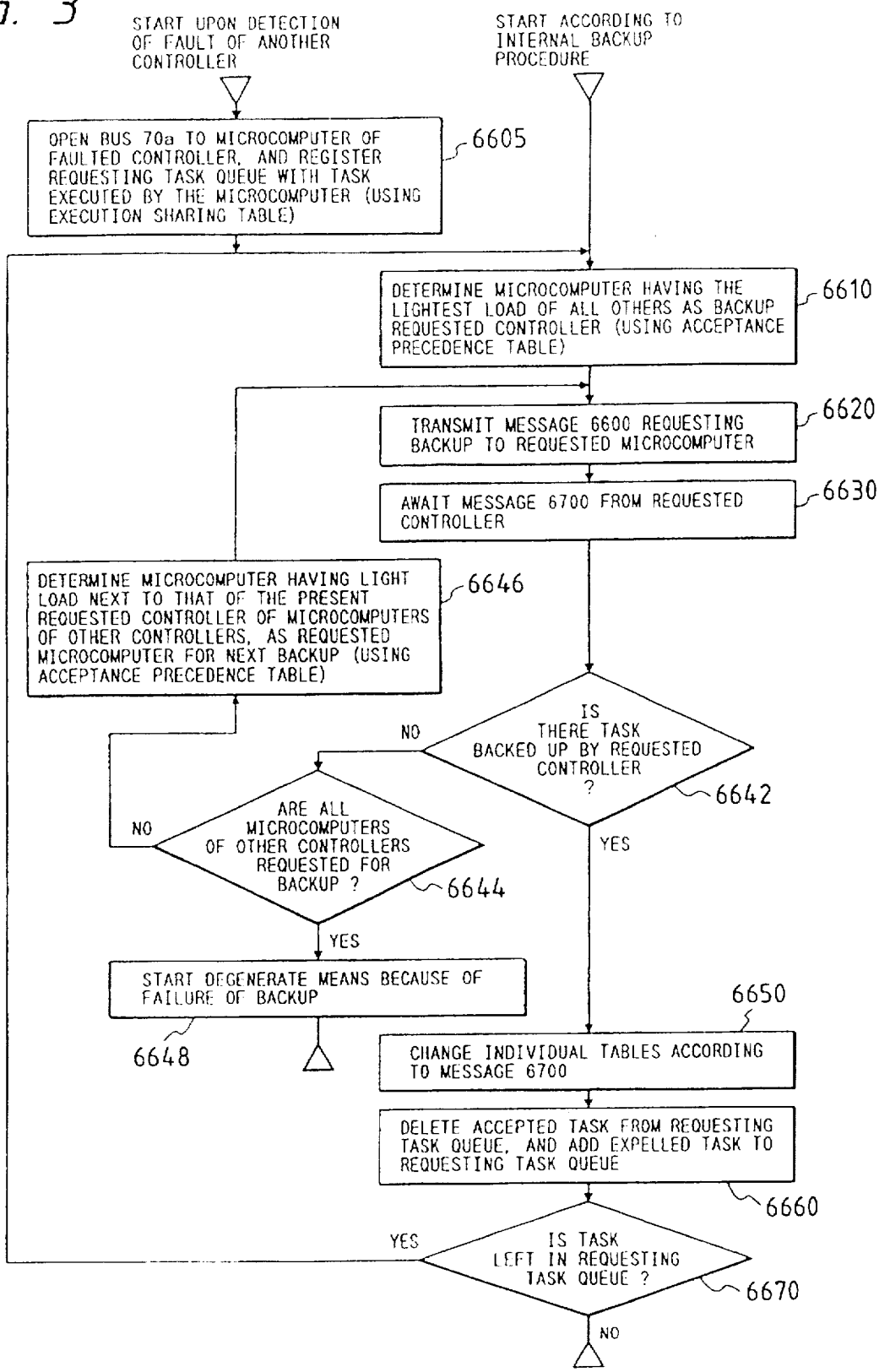
FIG. 3 is a flow chart showing one example of a autonomous backup requesting procedure of the present invention.

If any task to be backed up is left even after backups by all microcomputers, this situation is indicated to the backup request 6120 to start the procedure of the backups between the controllers, as shown in FIG. 3, and the internal backup 6170 is ended. This procedure, as shown in FIG. 2, is referred to as the "internal backup procedure", as will be described in detail in connection with a specific example, but is schematically described in the following for explaining the function of the internal backup control 6170.

First of all, at Steps 6510 and 6515, the internal backup control 6170 determines a microcomputer from the controller which will accept the backup of a task which cannot be executed because of a malfunction. This determination uses the information on the execution states of the individual microcomputers stored in the memory unit 6160. Specifically, a microcomputer having a low load or a high excess performance is determined for backing up many tasks. Incidentally, this information is stored in a table, which will be called the "execution sharing table", as shown in FIG. 7. Of the tasks to be executed, which have been affected by the malfunction, moreover, a task to be backed up is determined. This determination information is concerned with the attributes of tasks and excludes tasks which need not be backed up by other microcomputers. This information on the tasks attributes is stored in the table, which will be called the "task load table", as shown in FIG. 9.

At subsequent Steps 6520 to 6540, the function adds a plurality of tasks, which were being executed before the backup by the portions in charge of the backup, to the task to be backed up. Of these, the task to be executed after the backup by the backup microcomputer is selected in accordance with priority. At this time, a task which is indispensable for supervising the controller, such as the task for providing the communication 6110, the backup request 6120 and the scheduler 6140, is selected with the highest priority so that a partial disabling may not cause the entire controller to be disabled. The task requiring a large amount of communication in the case of backups by other controllers is selected with the next highest priority so that a bottleneck of the communication through the network 1000 may not be created to cause a communication fault. After this, other tasks are selected. Thus, the individual tasks are given priorities. In each priority, a task is selected in a combination of the highest load so that the load upon the backup microcomputer may not exceed a limit value. This load limit is stored in the memory unit 6160 and will be called the "limit load factor". The information to be used in this selection is concerned with the load factor of each task stored in the memory unit 6160, the priority in this selection, and the domicile of the task. The load factor of a task is the processing time which is required for each unit time in case a task under consideration is executed by a corresponding microcomputer, and is measured when the execution is made by a microcomputer having a similar processing ability or by a corresponding portion. A value determined in advance by an estimation is used in case an actual measurement is impossible for some reason. The domicile of a task indicates either the controller to which each task belongs by nature, or its portion. Incidentally, this information is stored in a table called the "task load table", as shown in FIG. 9. In this selection, moreover, in case the task has a low priority even if it was executed before the backup by the microcomputer in charge of the backup, it may not be executed after the backup. In other words, this task may be expelled. The task thus expelled is added to a task to be backed up and awaits a backup by another microcomputer.

Subsequently, the present function registers the selected task in the scheduler 6140 and starts the execution by the control task execution 6150. The task expelled from the backup microcomputer is deleted from the scheduler 6140 so that its execution is halted.

Subsequently, the present function executes three types of processings through Steps 6560 to 6590 in accordance with both the situation of the task to be backed up and whether or not a microcomputer out of charge of the backup is present in the controller.

Let a first case be considered, in which a task having a high priority is among ones to be backed up and in which all the active microcomputers in the controller are not in charge of the backup. Then, a microcomputer having a low load factor is selected as one to be in charge of the backup, and the internal backup procedures are repeated again at Step 6520. This repetition of assigning the backup sequentially to the individual microcomputers in the controller is made so that many tasks or loads can be backed up in the controller.

In the cases, on the other hand, in which a task to be backed up is one having a low priority and in which a task having a high priority is left among those to be backed up, but all the active microcomputers in the controller are assigned charge of the backup, the new execution situation of the controller is broadcast through the network 1000. Then, it is indicated to the backup request 6120 that there is left a task to be backed up, so that the task to be backed up may be backed up by another controller. Moreover, the procedure concerning the backup between the controllers of FIG. 3 is started to end the processing of the present procedure.

In case, on the other hand, there is no task to be backed up, the new execution situation of the controller is broadcast through the network 1000, and the processing of the present function is ended.

The backup request 6120 is connected with the communication 6110, the memory unit 6160 and the internal backup 6170. This function selects, in case it is informed by the internal backup 6170 of the fact that a task to be backed up is left, a requested microcomputer of the backup from another controller connected with the network 1000 or its microcomputer in accordance with the procedure of FIG. 3, and requests the backup. These selections and requests are repeated till the backups of all tasks are ended. This procedure is called the "backup requesting procedure", as will be described in detail in connection with a specific example, but it is schematically described for explaining the present function.

This function selects at Step 6610 a controller to be requested for the backup or its microcomputer by using the information states of all microcomputers stored in the memory unit 6160. The standard for this selection is that the controller selected has the lightest load of microcomputers of other controllers. Incidentally, this information is stored in the acceptance precedence table shown in FIG. 8.

At subsequent Steps 6620 to 6640, the present function transmits a message 6600 indicating a request for a backup to the requested microcomputer selected before. The message 6600 includes information of the task to be backed up. This message 6600 is sent through the network 1000. The present function then awaits an answer from the requested microcomputer. This answer is a message 6700 which is broadcast to the entire system by the requested microcomputer and which indicates that it is an answer to the request for a backup. The message 6700 further contains information indicating both the task backed up by the requested microcomputer and the task (or the expelled task) which was not executed by the requested microcomputer because of the former backup. The present function has come into its standby state till it receives the message 6700, and is released from its standby state upon reception of the message 6700, to advance next to Step 6642.

At subsequent Steps 6642 to 6648, the present function decides whether or not there is a task backed up by the requested microcomputer. If the answer is YES, the present function advances to Steps (6650 to 6670) for determining the end of the request for the backup. If there is no task backed up by the requested microcomputer, it is determined at Step 6644 whether or not all the microcomputers of other controllers have been requested for backup. If the answer is NO, the microcomputer having the next lightest load to that of the present requested control of the microcomputers of other controllers is designated at Step 6646 as the requested microcomputer of a next backup. Then, the present function returns to Step 6620, at which the requests for backup are repeated. If, on the other hand, all the microcomputers of other controllers are requested for a backup, the backup itself has failed. In this case, therefore, a degeneration is started by degenerate means, as indicated at Step 6648, and the present function ends the backup requesting procedure.

If it is decided at Step 6642 that there is a task backed up by the requested microcomputer, the present function at Steps 6660 and 6670, changes the individual tables stored in the memory unit 6160, in accordance with the message 6700 coming from the requested microcomputer. Furthermore, the present function deletes the task backed up by the requested microcomputer from the tasks to be backed up, and adds the task expelled from the requested microcomputer to the tasks to be backed up. After this, the present function decides whether or not there is a task to be backed up, and returns to Step 6610, if the answer is YES, to repeat the selection of the requested microcomputer and the request for the backup. Thanks to this repetition of the request and the rejection or acceptance of the requested microcomputer, the task to be backed up can be autonomously distributed and backed up.

The backup acceptance 6130 is connected with the communication 6110 and the memory unit 6160. In response to the message 6600 sent from another controller through the network 1000 to request a backup, this backup acceptance 6130 backs up the task which is requested to be backed up by the message 6600, in accordance with the procedure of FIG. 4 and in dependence upon the load state of the microcomputer requested for the backup. In this procedure, the task for which backup is requested and the task being executed by the microcomputer are interchanged so that the load factor of the microcomputer in charge of the backup may be increased as high as possible within a limit load factor. This interchange is a function necessary for backing up the task having a considerably large load factor. Even without any margin for backing up the task having a high load factor, this task can be frequently backed up if a margin is prepared for expelling a task having a low load factor. The task thus expelled will be executed as one to be backed up if requested for backup by another microcomputer. Alternatively, another interchange may be caused, but a task of a low load factor is expelled at each interchange. As a result, the possibility of backup is enhanced so that the backup can be finally executed. If, in this interchange, either a task indispensable for supervising its own controller or a task requiring a lot of communication in case it is executed by another controller, causes the malfunction of its own controller or a fault in the communication due to a bottleneck of the amount of communication of the network 1000. In order to prevent this failure, the present procedure selects an indispensable task or a task involving a lot of communication is selected with priority. Moreover, the present function informs the entire system of the result of the backup. This procedure is called the "backup accepting procedure", as will be described in detail in connection with a specific example, but it is schematically described in the following so as to explain the function of the present procedure.

At Steps 6710 to 6730, this function selects, according to priority, a task, which is to be executed after the backup by a microcomputer in charge of the backup, from the tasks to be backed up and the plurality of tasks being executed by the backup microcomputer. At this time, in order to prevent its own controller from going down due to the backup, a task indispensable for supervising its own controller such as a task for providing the communication 6110, the backup request 6120 and the scheduler 6140, is selected with the highest priority. In order to prevent a bottleneck due to the amount of communication of the network 1000 from being created to cause a communication fault, the task, which will require much communication if executed by another controller, is selected with the next highest priority. After this, another task is selected. In each priority, there is selected a task which has such a combination that the microcomputer in charge of the backup may take the maximum load within the limit value. This load limit value is stored in the memory unit 6160 and will be called the "limit load factor". This selection is identical to that of Step 6530 of the internal backup procedure of FIG. 2. In this selection, moreover, even the task, which has been executed before the backup by the microcomputer in charge of the backup, may not be executed after the backup if it has a low priority. Subsequently, the present function registers the selected task with the scheduler 6140 and causes the microcomputer to start its execution. The task expelled from the backup microcomputer is deleted from the scheduler 6140, and its execution is halted.

At subsequent Step 6740, the present function broadcasts the message 6700, including the information indicating the task to be backed up and the task to be expelled, over the network. The change in the execution state of its own controller is indicated by that message 6700 to all other controllers. Moreover, the present function rewrites the execution sharing table, the task load table and the acceptance precedence table, which are stored in the individual memory units 6160, 6260, 6360 and 6460 of all controllers, in response to the message 6700. On the basis of this message 6700, as described above, the backup request (any of 6220, 6320 and 6420) of the requesting microcomputer deletes the task backed up from the tasks to be backed up. Moreover, the expelled task is added to the tasks to be backed up.

Thus, the plurality of tasks being executed by one down controller are distributed according to the loads of the active controllers requested for the backup so that they are finally backed up by the plurality of controllers. In short, in the distributed control system of the present invention, one down controller is backed up by the plurality of active controllers sharing the load according to their load situations. In this backup, moreover, the sharing is carried out for the backup according to the attributes concerning the amount of communication of the task, so as to suppress an increase in the amount of communication on the network.

Figure 5:
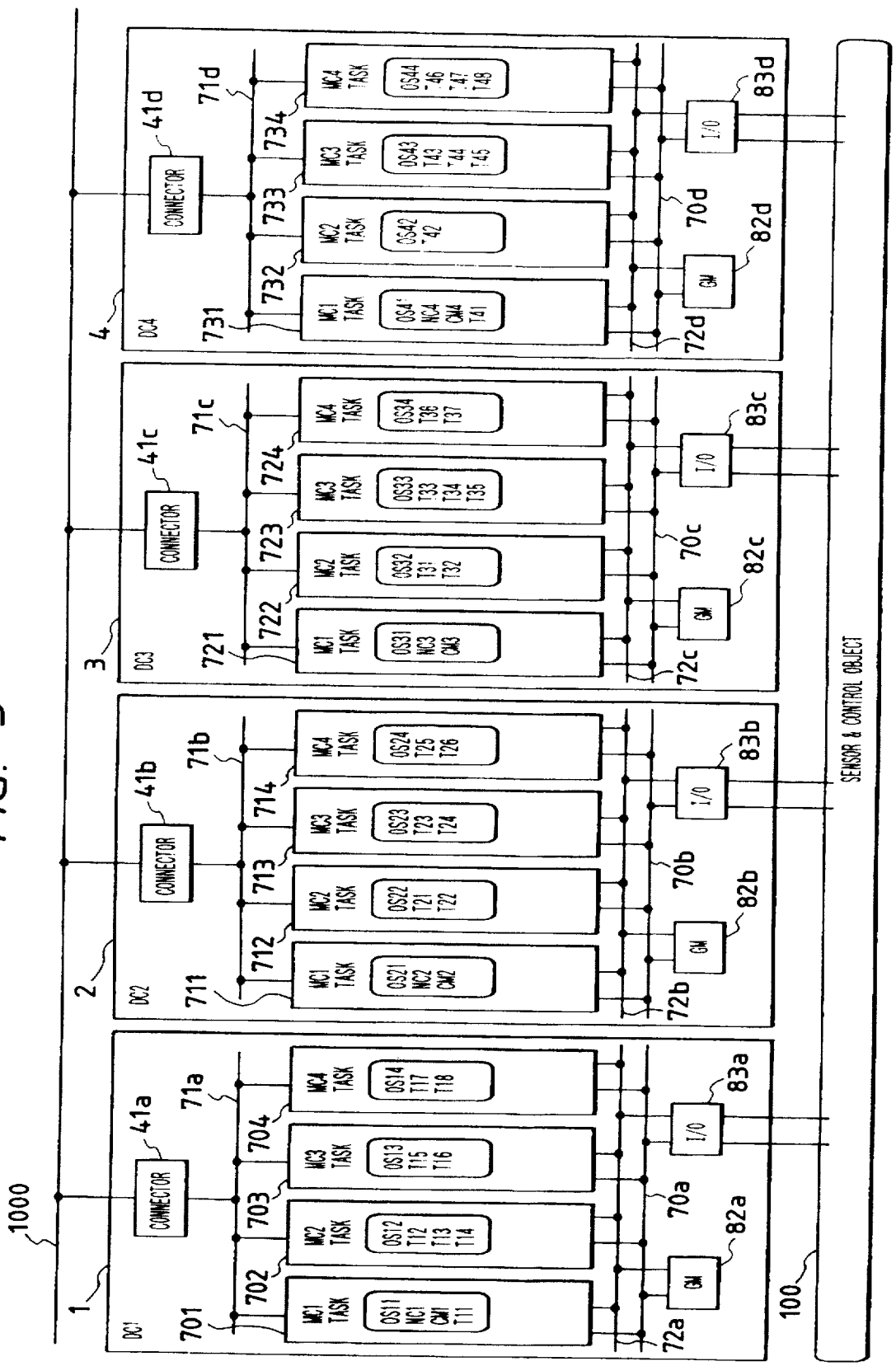
FIG. 5 is a schematic circuit diagram showing one embodiment of the self-distributed control system according to the present invention.

An example of the physical construction of this distributed control system is shown in FIG. 5. The controllers 1, 2, 3 and 4 are given identical constructions individually including: network transmit/receive units (or connectors) 41a, 41b, 41c and 41d connected with the network 1000; four microcomputers (MC1, MC2, MC3 and MC4) 701 to 704, 711 to 714, 721 to 724, and 731 to 734 connected individually with respective ones of the network transmit/receive units (or connectors) through serial data buses 71a, 71b, 71c and 71d; global memories 82a, 82b, 82c and 82d connected with the microcomputers (MC1, MC2, MC3 and MC4) through buses 70a, 70b, 70c and 70c; input/output processing units (I/O) 83a, 83b, 83c and 83d connected with the microcomputers (MC1, MC2, MC3 and MC4); and the buses 70a, 70b, 70c and 70d connected with the microcomputers. The individual controllers are designated at DC1, DC2, DC3 and DC4. The individual microcomputers in the individual controllers are designated at MC1, MC2, MC3 and MC4. Here, the individual microcomputers are assumed to execute tasks, as specified therein. Here, tasks NC1, NC2, NC3 and NC4 control the message transmissions/receptions between the controllers through the network 1000 to provide the communications 6110, 6210, 6310 and 6410 of FIG. 1. On the other hand, tasks CM1, CM2, CM3 and CM4 control the executions of the tasks in the individual controllers 1, 2, 3 and 4 to provide the backup requests 6120, 6220, 6320 and 6420 of FIG. 1 and the backup acceptances 6130, 6230, 6330 and 6430. The tasks having designations starting from letter T are the control operations to be executed by the individual controllers and are processed by executing the control tasks of FIG. 1. Tasks such as OS11 starting with the letters OS are real time operating systems having backup functions incorporated thereinto and are executed by the individual microcomputers. These tasks individually provide the internal backup controls 6170, 6270, 6370 and 6470 of FIG. 1. Moreover, these individual real time operating systems execute the schedulings concerned with the individual microcomputers independently of one another. Specifically, the operating systems distribute the schedulers 6140, 6240, 6240 and 6440 of the individual controllers and provide them to the portions concerned with the individual microcomputers.

Figure 6:
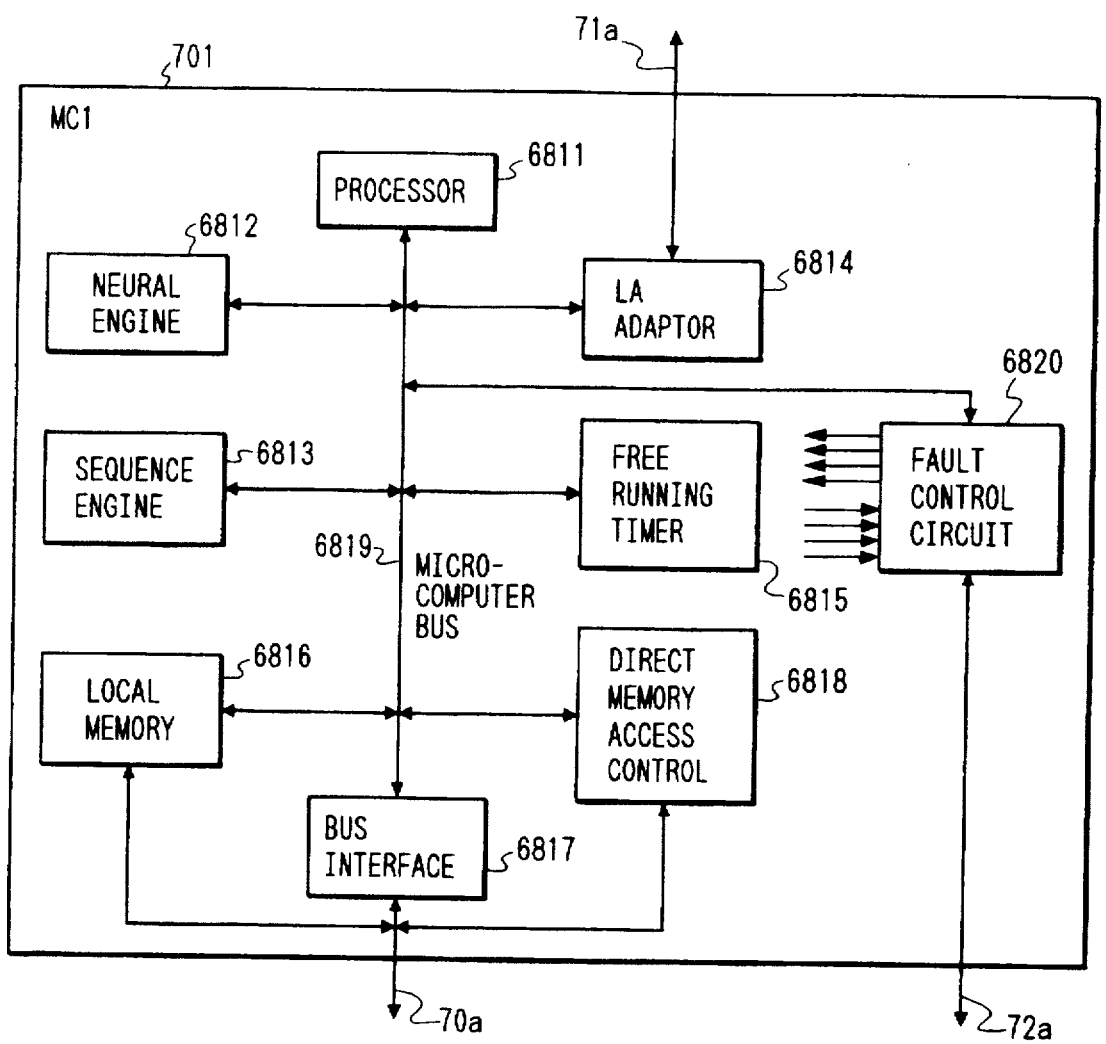
FIG. 6 is a block diagram showing one embodiment of a microcomputer for the self-distributed control system shown in FIG. 5.

The individual microcomputers are given a common construction, as will be described by taking the microcomputer (MC1) as an example with reference to FIG. 6. The microcomputer (MC1) 701 includes: a processor (PR) 6811 for executing a task; a neural engine (NE) 6812 for accelerating the neuro operation contained in the task; a sequence engine (SE) 6813 for accelerating the sequence controlling operation contained in the task; a local memory (LM) 6816 for copying and storing a portion of the content of the global memory (GM) 82a to prevent a performance drop due to an access conflict of another microcomputer with the global memory (GM) 82a; a bus interface (BIF) 6817 for coupling the bus 70a and a bus 6819 in the microcomputer in case the memory to be accessed is the global memory (GM) 82a; a direct memory access control (DMAC) 6818 for executing a high speed transfer between the local memory (LM) 6816 and the global memory (GM) 82a; a free running timer (FRT) 6815 acting as a scheduling clock; a run adapter (LA) 6814 connected with the network transmit/receive unit 41a for executing the conversions from serial data to parallel data or vice versa and the coding/decoding; and a fault control circuit 6820 for detecting a fault of each component to stop the operation of the microcomputer and to inform another microcomputer of a fault through the bus 70b. Moreover, the individual components are connected through the bus 6819.

Here, the fault control circuit 6820 provides a faulty portion isolating function by using the bus 70b as a communication passage in association with the fault control circuit of another microcomputer. In case the microcomputer 702 of FIG. 3 is faulty, for example, its fault control circuit detects the fault to inform the remaining microcomputers 701, 703 and 704 of the fault of the microcomputer 702 through the bus 70b. At the same time, the fault control circuit of the microcomputer 702 halts the operation of the processor (PR) of the microcomputer 702. Moreover, the individual fault control circuits of the microcomputers 701, 703 and 704 start the internal backup procedures in the tasks OS11, OS13 and OS14 which provide the internal backup control functions being executed by the individual processors PR. Thus, the function in the faulted portion isolation 6180 of FIG. 1 is physically realized by the individual software of the fault control circuits FD 6820 which are packaged in the four microcomputers.

Moreover, all the microcomputers in the individual controllers of FIG. 3 have the random adopters (LA) so that they can operate as the communications 6110, 6210, 6310 and 6410. Although neither the hardware nor the software of the communications are made redundant in the prior art, they can be made redundant to improve reliability in the construction of the present embodiment. Of the four run adapters (LA) in each controller, what actually act as the communications 6110, 6210, 6310 and 6410 are the run adapters (LA) of the microcomputers executing the tasks NC1, NC2, NC3 and NC4. In short, even if the active run adapters (LA) are faulty so as to make the communication inactive, the communication can be restored by backing up the tasks NC1, NC2, NC3 and NC4 in the controllers On the other hand, the prior art has a problem that, in case the processors or microcomputers have local memories packaged therein, the learning control parameters stored in the local memories cannot be accessed if the processors or microcomputers go down. Therefore, the local memory (LM) 6816 is provided as a dual port memory and is connected with not only the bus 6819, but also the bus 70a. By this connection, the local memory (LM) 6816 can be accessed from another microcomputer through the bus 71a. Thanks to this construction, the global memory (GM) and the four local memories (LM) can be handled as a single memory. The local memories (LM) and the global memories (GM) of the four microcomputers (MC1, MC2, MC3 and MC4) in the controller are shown in FIG. 1 as the memory units 6160, 6260, 6360 and 6460. The individual tables and data may belong to any of the memories.

Now there will be described in detail a backup method according to the present embodiment. FIG. 7 presents an execution sharing table in the operating state of FIG. 5, and this table is stored in each of the memory units 6160, 6260, 6360 and 6460. This table contains: the names capable of specifying the microcomputers; the names of tasks being executed by the microcomputers; the load factors to be borne by the microcomputers by those tasks; and the sequence (i.e., internal load precedence) as numbered in the order of lighter loads from 1 to the individual microcomputers in each controller. In this embodiment, names are given to specify the microcomputers by joining the controller names and the microcomputer names. Another specifying system may give different numbers. The system to be used for specifying the microcomputers may be any type of system because they have no relation to the gist of the present invention. By using this table, the internal backup controls 6170, 6270, 6370 and 6470 retrieve the tasks to be backed up from the names of the down microcomputers and the internal load precedence so as to assign backup consecutively from the microcomputer having a lighter load to the microcomputer having a heavier load in a common controller. Incidentally, without any internal load precedence, the internal backup control 6170 can generate information equivalent to the internal load precedence on the basis of the microcomputer names and the load factors to execute the aforementioned processings, but the time period till the backup is established gets longer because the information is generated midway of the backup. In order to shorten the time period till the backup is established, the present embodiment adopts a system in which the internal load precedence is generated when in the ordinary active state and is stored in the execution sharing table.

FIG. 9 presents a task load table in the operating state of FIG. 5, and this table is stored in the individual memory units 6160, 6260, 6360 and 6460. This table contains: the names of tasks; the load factors when the tasks are executed, the attributes relating to the backup; and the domiciles indicating what microcomputer a task belongs to. There are four attributes: the "fixed" attribute indicating that the task is indispensable for the domicile microcomputer but need not (or should not) be backed up by another microcomputer; the "internally" attribute indicating the task is necessary for superposing the controllers; the "communicative" attribute indicating that the amount of communication is substantial; and the "somewhere" attribute indicating that the task may be executed by another controller other than domicile one. Thus, the tasks to be backed up by other microcomputers have attributes other than the "fixed" one. These attributes are handled according to the priority of a microcomputer and are arranged in the descending order from one having a higher priority in a microcomputer, as follows: the most prior one is the "fixed" attribute in which the microcomputer belongs to the domicile; the next prior one is the "internally" attribute in which the microcomputer belongs to the domicile; the next prior one is the "communicative" attribute in which the microcomputer belongs to the domicile; and the least prior ones are those having the "somewhere" attribute, in which the microcomputer belongs to the domicile, and those having the "fixed", "internally", "communicative" and "somewhere" attributes, in which the microcomputer does not belong to the domicile. However, the backups of the tasks, which have the "fixed" or "internally" attribute for the computers other than the domicile, would fault the controllers or the system. Thus, these backups are avoided in the backup procedure. Specifically, the tasks are backed up with the most priority by the domicile microcomputers or the controller including them (herein called the "domicile controllers"). The internal backup controls 6170, 6270, 6370 and 6470 and the backup acceptances 6130, 6230, 6330 and 6430 use the task load table so as to know the contents of tasks from the task names, when the tasks to be executed after the backups are to be selected with respect to the priorities, domiciles and load factors of the individual tasks from both the tasks to be backed up and the tasks being executed by the microcomputers in charge of the backups.

FIG. 8 presents an acceptance precedence table in the operating state of FIG. 5, and this table is stored in each of the memory units 6160, 6260, 6360 and 6460. This table is used for the backup requests 6120, 6220, 6320 and 6420 to retrieve at first the name of the microcomputer having the minimum load factor from the microcomputers of other controllers and then, if necessary, to retrieve the names of the microcomputers having the heavier loads consecutively. This table is prepared by arranging the microcomputer names in an ascending order in terms of the load factor. Thus, the information of the present table is contained in the execution sharing table, but it takes a long time to retrieve the microcomputer having the least load factor from the execution sharing table. Hence, this table is provided with a view to shortening the retrieving time period. According to this table, the name of the microcomputer having the least load factor of all the microcomputers can be retrieved merely by reading the name of the leading microcomputer. If the microcomputer having the least load factor belongs to the controller requesting the backup, a next order is read out. By repeating this, it is possible to select the microcomputer having the least load of other controllers. The present table is rewritten each time a down condition or backup occurs but has its ascending order maintained by the three deleting, retrieving and inserting Steps because it is eventually arranged. In case this acceptance precedence table is used, therefore, the processing is speeded up because the content of the execution sharing table need not be shorted at the backup time. In other words, the time period necessary for the backup can be shortened.

Now there will be described the relations among the contents of the execution sharing table, the task load table and the acceptance precedence table. What is executed by the microcomputer DC1.MC1 is found to be the tasks OS11, NC1, CM1 and T11 from the execution sharing table. The load factor at this time is found to be 5% for the task OS11, 26% for the task NC1, 28% for the task CM1 and 13% for the task T11 from the task load table so that the microcomputer DC1.MC1 has a summed load factor of 72%. If the load factor of the microcomputer, as has been omitted in the example of the execution sharing table, is far higher than that summed value, the microcomputer DC1.MC1 is the third in the ascending order so that it takes the third order in the acceptance precedence table.

Figure 10:
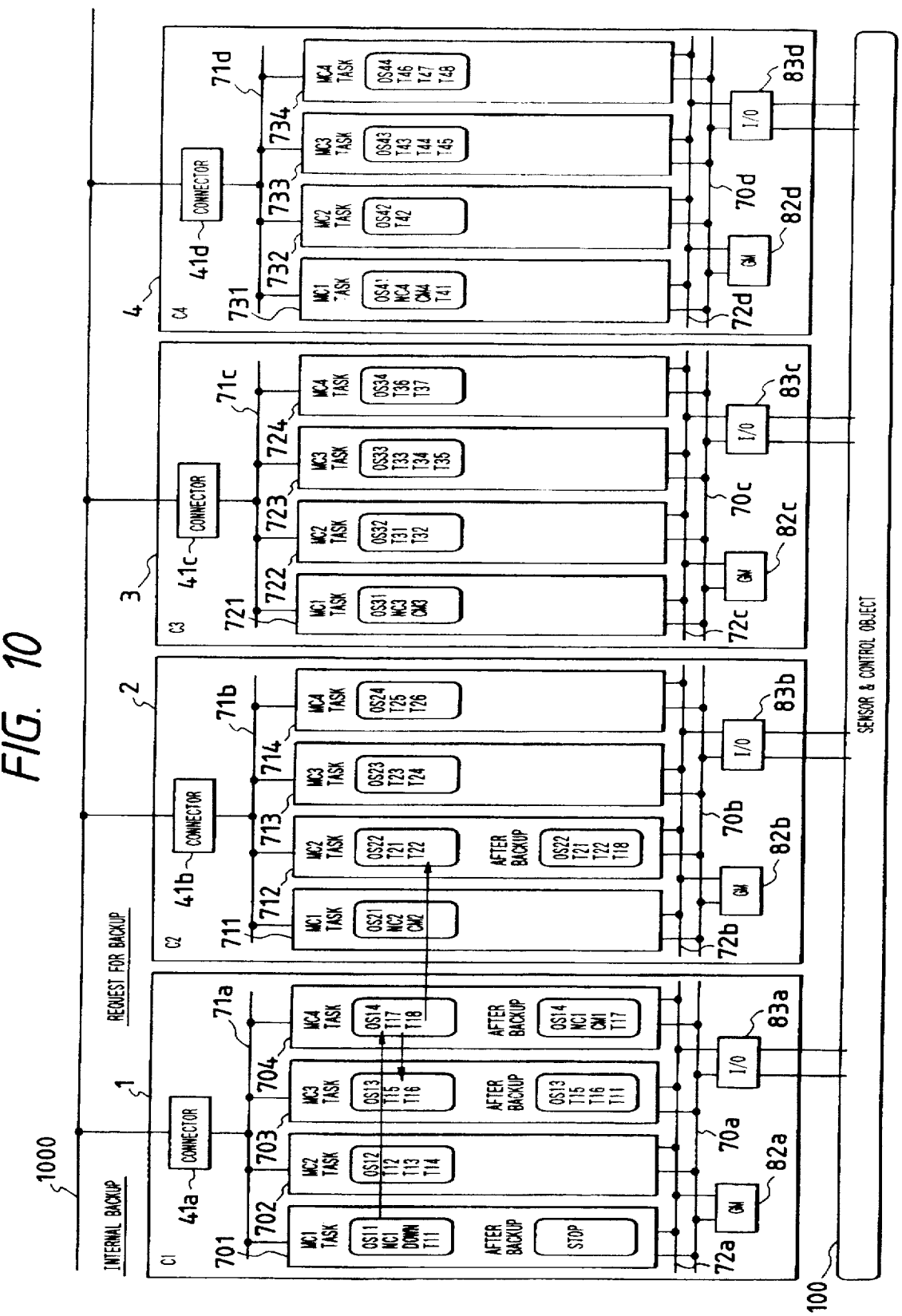
FIG. 10 is a selective circuit diagram showing a backup procedure of the self-distributed control system according to the present invention.

Here will be described the following procedures so as to facilitate understanding of the backup procedure of the present embodiment. If the microcomputer (DC1.MC1) 701 goes down, as shown in FIG. 10, the tasks NC1, CM1 and T11 are distributed and backed up, and the tasks expelled are further backed up by other microcomputers. Here, it is assumed that the aforementioned limit load factor is determined to be 90%.

(FD0) It is assumed that the processor 6811 of the microcomputer 701 of the controller 1 is faulty. Due to this fault, the communication 6110, the backup request 6120 and the backup acceptance 6130 go down, and the individual portions of the scheduler 6140 and the control task execution 6150 also go down.

(FD1) The faulted portion isolation 6180 of the controller 1 halts the microcomputer 701 if it detects the malfunction of the microcomputer 701. Simultaneously with this, the malfunction of the microcomputer 701 is indicated to the internal backup 6170 to cause the internal backup 6170 to start the internal backup procedure of FIG. 2.

More specifically, if the fault control circuit (FD) 6820 of the microcomputer 701 detects a fault in the processor (PR) 6811, it informs the fault control circuit (FD) of another microcomputer of the faulty condition of the microcomputer 701 through the bus 70b. After this, the microcomputer 701 is halted. In response to the fault, the fault control circuits (FD) 6820 of the microcomputers 702, 703 and 704 demand that the individual processors 6811 issue an interruption through the interruption demand signal line of the bus 70a. This interruption starts the internal backup procedure in the tasks OS12, OS13 and OS14 providing the internal backup control 6170. Incidentally, the local memory (LM) 6816 of the halted microcomputer is connected with the bus 70a so that it can be accessed from another microcomputer even if that microcomputer is halted. This connection can be acquired even if the microcomputer halts the data necessary for backing up and reopening the tasks.

Figure 4:
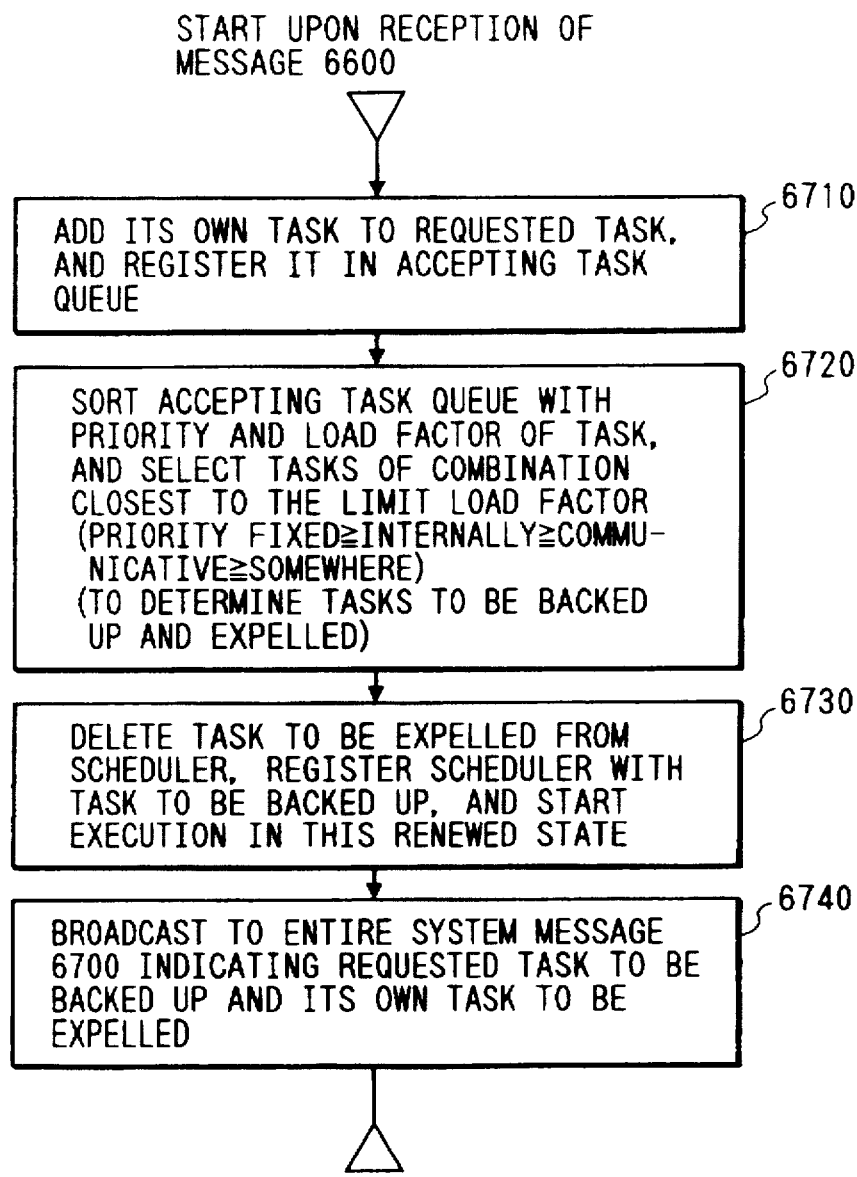
FIG. 4 is a flow chart showing one example of a autonomous backup accepting procedure of the present invention.

Here will be the internal backup procedure, as shown in FIG. 4, to be executed in the internal backup control 6170.

(OS0) The internal backup control 6170 is started. In all the active microcomputers, more specifically, the tasks managing the internal backups execute the internal backup procedure of FIG. 4 independently of one another. In the example of FIG. 10, the task OS12 executes the internal backup procedure in the microcomputer (DC1.MC2) 702. In the microcomputer (DC1.MC3), the task OS13 executes the internal backup procedure. In the microcomputer (DC1.MC4) 704, the task OS14 executes the internal backup procedure. The task out of charge of the backup halts itself so that the task for executing the backup automatically is determined. Since there is no specific dependency as to the backup between the microcomputers, the controller can have its inside constructed of uniform hardware and uniform software so that the controllers can be easily constituted. Thus, the internal backup means of FIG. 4 is constituted. This determining method will be described at the following Step.

(OS1) Step 6510: The internal backup control 6170 determines the microcomputer having the lightest load of the aforementioned active microcomputers as the backup microcomputer.

Specifically, the aforementioned tasks individually read out the internal load precedence of the down microcomputer and its own internal load precedence from the execution sharing table. The down microcomputer takes the first internal load precedence if its load is the lightest, as described above. If the internal load precedence is the first, therefore, the microcomputer having the lightest load of the active microcomputers has a second internal load precedence. In this case, the microcomputer determines whether or not it takes charge of the backup, by deciding that its internal load precedence is the second. If the internal load precedence is the second, the communication 6110 takes charge of the backup, and the procedure advances to Step 6520. Unless the internal load precedence is the second, the microcomputer ends the internal backup Step but does not take charge of the backup. If, on the other hand, the loads of the active microcomputers are lighter than that of the down microcomputer, the microcomputer having the lightest load of the active ones takes the first internal load precedence. In this case, the microcomputer determines whether or not it takes charge of the backup, by deciding that its internal load precedence is the first. If the internal load precedence is the first, the microcomputer takes charge of the backup, and the procedure advances to Step 6520. Unless the internal load precedence is the first, the microcomputer ends the internal backup procedure but does not take charge of the backup.

In the example shown in FIG. 10, the down microcomputer (DC1.MC1) 701 takes the second internal load precedence, as presented in the execution sharing table of FIG. 7, the microcomputer (DC1.MC2) 702 takes the fourth internal load precedence, so that the task OS12 ends the internal backup procedure at Step 6510. Moreover, the microcomputer (DC1.MC3) 703 takes the third internal load precedence so that the task OS13 ends the internal backup procedure at Step 6510. On the other hand, the microcomputer (DC1.MC4) 704 takes the first internal load precedence so that the task OS14 advances from Step 6510 to Step 6520 and continues the internal backup procedure. Thus, the microcomputer (DC1.MC4) 704 executes the backup at first.

(OS2) Step 6515: The internal backup control 6170 registers the task queue with the task to be backed up of those which cannot be executed due to the malfunction. Specifically, the accepting task queue is initialized at first. Then, the internal backup control 6170 reads the task names corresponding to the names of the down microcomputer and reads the load factors and attributes corresponding to those tasks from the task load table. Then, the tasks, which have the "fixed" attribute indicating that they need not be backed up or should not be backed up by other microcomputers, are excluded and registered as the tasks to be backed up in the accepting task queue. In the example of FIG. 10, the task names OS11, NC1, CM1 and T11 corresponding to the name DC1.MC1 of the down microcomputer (DC1.MC1) are read out from the execution sharing table, and their individual load factors of 5%, 26%, 28% and 13% and the attributes "fixed", "communicative" and "somewhere" are read out from the task load table. Moreover, these contents are registered in the accepting task queue excepting the information concerned with the task OS11 having the "fixed" attribute.

(OS3) Step 6520: The internal backup control 6170 adds the tasks, which are being executed by the microcomputer in charge of the backup, to the accepting task queue. Specifically, the internal backup control 6170 reads out the task names corresponding to the names of the microcomputers in charge of the backup from the execution sharing table and reads out the load factors and attributes corresponding to those tasks from the task load table. Then, those tasks are added to the accepting task queue. Simultaneously with this, their load factors and attributes are also added.

The operations on and after this procedure are repeatedly executed till all the microcomputers in the controller take charge of the backup or till the tasks to be backed up are exhausted. In the present execution of the example of FIG. 10, the task names OS14, T17 and T18 corresponding to the name DC1.MC4 of the microcomputer 704 in charge of the backup are read out from the execution sharing table, and their load factors of 5%, 25% and 26% and attributes "fixed", "internally" and "communicative" are read out from the task load table. These tasks are added to the accepting task queue.

(OS4) Step 6530: The internal backup control 6170 selects the tasks to be executed from the accepting task queue after they have been backed up by the microcomputer in charge of the backup. Specifically, the accepting task queue is rearranged in terms of the priority and the load factor according to the task attributes so that a combination of the tasks having higher priorities closest to the limit load factor is selected. If, moreover, the load factor has a margin even after all have been selected, a combination of the tasks having next higher priorities closest to the margin will be selected. These combinations and selections are repeated till some tasks having some priority grows unselectable. In the example of FIG. 10, the accepting task queue takes the content shown in FIG. 11 so that the tasks OS14, NC1, CM1 and T17 are finally selected. Here, the tasks to be backed up are NC1 and CM1; the task not to be backed up is T11; and the task to be expelled is T18.

(OS5) Step 6540: The tasks selected at the previous Step are deleted from the accepting task queue. Specifically, the names, load factors and attributes of the tasks selected at the previous Step are deleted from the accepting task queue. In the example of FIG. 10, the tasks OS14, NC1, CM1 and T17 are finally selected. At the present Step, those tasks are deleted from the accepting task queue. The tasks left in the accepting task queue are the task T11, which has failed to be backed up, and the task T18, which has been expelled.

(OS6) Step 6550: The tasks selected at Step 6530 are registered in the scheduler 6140, and their executions are started. Specifically, the tasks to be backed up are registered in addition to the tasks which take charge of the scheduling of the microcomputer in charge of the backup, and the tasks to be expelled are deleted from the registration. In the example of FIG. 10, the tasks NC1 and CM1 to be backed up are registered in addition to the task taking charge of the scheduling of the microcomputer 704 in charge of the backup, i.e., the task OS14 acting as the real time operating system, and their executions are started. Moreover, the task T18 to be expelled is deleted from the scheduler, and the execution is halted. At this time, there are recovered the communication 6110, which has gone down due to the fault of the microcomputer 701, the backup request 6120 and backup acceptance 6130. From now on, it is possible to execute a communication with the network 1000, which is necessary for the backup between the controllers and for the execution of the control tasks.

(OS7) Step 6560: At this Step, the internal backup procedure is branched into three Substeps according to the backup situations. The first Substep is a branch to a processing for ending the procedure for the backup because the backup is completely ended. The second Substep is a branch to the processing for ending the internal backup and starting a backup between the controllers. The third Substep is a branch to the processing for repeating the internal backups. In Step 6560, those branches are executed at Steps 6562, 6564 and 6566. At Step 6562, it is decided whether or not there is a task to be backed up, i.e., the task having a high priority in the tasks left in the accepting task queue. The procedure advances to Step 6564, if the answer is YES, but to Step 6566 if the answer is No. At Step 6564, it is decided whether or not all the microcomputers in the controller have been given charge of the backup. If the answer is YES, the procedure is branched into the processing for starting the backup between the controllers at and after Step 6574. If the answer is NO, the procedure is branched to the processing for repeating the internal backups at and after Step 6580. At Step 6566, it is decided whether or not there is left a task to be backed up, that is, whether or not any task is left in the accepting task queue. If the answer is YES, the procedure is branched to the processing for starting a backup between the controllers at and after Step 6574. If the answer is NO, the procedure is branched to the processing for ending the procedure concerned with the backups at and after Step 6572.

In the example of FIG. 10, the task T11 having the "communicative" attribute and a high priority is now left in the accepting task queue, and only the microcomputer 704 is given charge of the backup. Thus, the procedure is branched to the processing for repeating the internal backup at and after Step 6580.

(OS8) Step 6580: The microcomputer having a light load next to that of the microcomputer having taken charge of the present backup is selected as the microcomputer in charge of a next backup, and the procedure is returned to Step 6520 for executing the next backup. Specifically, the internal acceptance precedence of the microcomputer taking charge of the present backup and the internal acceptance precedence of the down microcomputer are read out from the execution sharing table. The next internal acceptance precedence is determined by adding 1 to the former value. If this value is the acceptance precedence of the latter, the assignment of the down microcomputer is prevented by adding another 1. The microcomputer having that value as the internal acceptance precedence in the controller is determined from the execution sharing table. The microcomputer thus determined is the microcomputer in charge of the next backup. In the example of FIG. 10, the microcomputer 704 having taken charge of the present backup has a first internal acceptance precedence whereas the down microcomputer has a second internal acceptance precedence, so that the microcomputer in charge of the next backup has a third internal acceptance precedence. In the execution sharing table, therefore, the microcomputer 703 having the third internal acceptance precedence in the controller 1 is selected as the one in charge of the next backup. From now on, the second internal backup is entered. Of the individual procedures already described, only the procedure relating to the example of FIG. 10 will be described.

(OS9) Step 6520: In the present execution of the example of FIG. 10, the microcomputer 703 takes charge of the backup. Therefore, the task names OS13, T15 and T16 corresponding to the microcomputer name DC1.MC3 are read out from the execution sharing table, and the individual load factors of 5%, 28% and 41% and the "fixed", "somewhere" and "communicative" attributes are read out from the task load table. These are added to the accepting task queue.

(OS10) Step 6530: In the example of FIG. 10, the accepting task queue has the content, as shown in FIG. 12, so that the tasks OS13, T15, T16 and T11 are finally selected. Here, the task to be backed up is T11 whereas the task not to be backed up is T18, so that no task is expelled.

(OS11) Step 6540: In the example of FIG. 10, the tasks OS13, T15, T16 and T11 are finally selected. In the present procedure, these tasks are deleted from the accepting task queue. The task left in the accepting task queue is limited to the task T18 which was not backed up.

(OS12) Step 6550: In the example of FIG. 10, the task T11 to be backed up is registered in addition to the task taking charge of the scheduling of the microcomputer 703 in charge of the backup, i.e., the task OS13 acting as the real time operating system, and the execution is started. Since there is no task to be expelled, moreover, there is no task to be deleted from the scheduler and to have its execution stopped.

(OS13) Step 6560: In the example of FIG. 10, at this time, there is left in the accepting task queue only the task T18 which has the "somewhere" attribute and which need not be preferred to. Specifically in this state, there is left no task having a high priority but there is a task to be backed up. Therefore, the present procedure is branched to the processing at and after Step 6574 for starting the backups between the controllers.

(OS14) Step 6574: The message 6700 indicating a new execution state is broadcast to the network 1000. In response to this message, another controller can be informed of the down condition of the microcomputer and the new execution state of the microcomputer which has taken charge of the backup. In accordance with the content of that message, the individual controllers correct the execution sharing tables, task load tables and acceptance precedence tables stored in their individual memory units. In the example of FIG. 10, the message 6700 indicates the down condition of the microcomputer 701. The message 6700 further indicates, as new execution situations, the tasks OS13, T15, T16 and T11 being executed by the microcomputer 703 and the tasks OS14, NC1, CM1 and T17 being executed by the microcomputer 704. The execution sharing table and acceptance precedence table thus corrected are presented in FIGS. 14 and 15.

(OS15) Step 6590: The backup request 6120 is started to execute the backups between the controllers. Specifically, the tasks left to be backed up are transferred from the accepting task queue to the requesting task queue to be used by the backup request 6120, and the accepting task queue is emptied. Moreover, the backup request 6120 is informed of the fact that there is left a task to be backed up. This notice may be executed by making use of the inter-task communication function of the rear time operating system. Alternatively, the notice may be executed by making use of the message communication from its own controller to its own controller through the network 1000.

(OS16) Thus, the internal backup procedure is ended.

Subsequently, the backup procedure is transferred between the controllers, and the task T18 is backed up by another controller.

(CM1) The backup request 6120 of the controller 1 is started to start the execution of the backup request procedure of FIG. 3.

(CM2) Step 6610: The backup request 6120 uses the acceptance precedence table to determine, as the backup requested microcomputer, that one of the microcomputers of the controllers other than the controller including the down microcomputer which has the lightest load. Specifically, the name of the microcomputer having the first precedence is read out from the acceptance precedence table. If this microcomputer belongs to another controller, the reading is then halted to determine that microcomputer as the backup requested microcomputer. If the microcomputer belongs to the same controller as the down microcomputer, the name of the microcomputer having a next precedence is again read out from the acceptance precedence table. It is then decided whether or not that microcomputer belongs to another controller. The operations described above are repeated till the microcomputer belonging to another controller is read out. In the example of FIG. 10, the backup in the controller containing the down microcomputer is ended, and the acceptance precedence table of FIG. 8 is changed to that of FIG. 15. The name of the microcomputer having the first precedence is read out from the acceptance precedence table of FIG. 15. This microcomputer has the name DC2.MC2 and belongs to the controller DC2. Since the controller containing the down microcomputer is DC1, the microcomputer read out belongs to a controller different from the controller containing the down microcomputer. Without returning to the processing for reading the name of the microcomputer in the next precedence, therefore, the microcomputer (DC2.MC2) 712 is determined as the microcomputer to be requested for the backup. This microcomputer will be called the "requested microcomputer".

(CM3) Step 6620: The backup request 6120 prepares the message 6600 containing both information indicating the request for the backup and information indicating all of the task names registered in the requesting task queue, and transmits it to the requested microcomputer. This message will be called the "request message". In the example of FIG. 10, the request message 6600 requests the backup of the task T18 and is sent to the requested microcomputer or the microcomputer 712 through the network 1000.

(CM4) Step 6630: The backup request 6120 awaits the message 6700 to be broadcast from the backup requested microcomputer as an answer to the backup requesting message 6600.

From now on, the backup request 6120 interrupts the backup requesting procedure and comes into a standby state till the message 6700 is broadcast. Now there will be described the operations of the backup acceptance 6230 of the requested microcomputer.

(CM5) In the controller 2 containing the requested microcomputer 712, the communication 6210 receives the message 6500 to start the backup acceptance 6230. The backup acceptance 6230 starts the backup accepting procedure of FIG. 4. Here, the backup acceptance 6230 uses the accepting task queue and the task load table which are stored in the memory unit 6260 of the controller of which it is a part.

(CM6) Step 6710: The backup acceptance 6130 registers the accepting task queue with both the task requested by the message 6600 and the task being executed by the backup requested microcomputer. Specifically, the backup acceptance 6230 will initialize the accepting task queue in the memory unit 6260. Subsequently, the backup acceptance 6230 extracts the name of the task requested by the message 6600 and reads out the load factor, attribute and domicile corresponding to the task name from the task load table in the memory unit 6260 and registers it in the previously initialized accepting task queue. The backup acceptance 6230 reads out the task names corresponding to the names of the requested microcomputer from the execution sharing table in the memory unit 6260 and the load factors and attributes corresponding to the tasks from the task load table. These task names are added to the accepting task queue. Simultaneously with this, those load factors and attributes are also added.

In the example of FIG. 10, the accepting task queue is registered with the name T18 of the task requested for the backup by the message 6600. Simultaneously with this, the load factor of 26S, the "somewhere" attribute and the domicile DC1.MC4 corresponding to that name are read out from the task load table and are registered. Moreover, the task names OS22, T21 and T22 corresponding to the name DC2.MC2 of the microcomputer 712 requested for the backup are read out as the name of the task being executed by the microcomputer 712 from the execution sharing table. Moreover, the load factors of 5%, 18% and 35%, the "fixed", "communicative" and "somewhere" attributes, and the domiciles DC2.MC2, DC2.MC2 and DC2.MC2 corresponding to the individual tasks are read out from the task load table. Moreover, these task names, load factors, attributes and domiciles are added to the accepting task queue.

(CM7) Step 6720: The backup acceptance 6130 accepts the task, which is to be executed after the backup by the backup requested microcomputer, from the accepting task queue. Specifically, the accepting task queue is rearranged in terms of priority and the load factor according to the attributes of the task so that a combination of tasks having a high priority closest to the limit load factor is selected. If, moreover, the load factor has a margin even with the selection of all tasks, there is selected a combination of tasks having a next highest priority closest to the margin. In the example of FIG. 10, the accepting task queue has the content shown in FIG. 13, so that the tasks OS22, T21, T23 and T18 are finally selected. Here, the task backed up is T18, and there is neither a task which is not backed up, nor any task which is expelled. In short, all the tasks in the accepting task queue are selected.

(CM8) Step 6730: The backup acceptance 6130 registers the scheduler 6240 with the tasks selected at the previous Step and starts their executions. Specifically, the backup acceptance 6130 additionally registers the tasks to be backed up to the scheduler 6240 to start their executions. On the other hand, the registrations of the tasks to be expelled are deleted from the scheduler 6240, and the executions of the same are halted. In the example of FIG. 10, the task T18 is registered, and its execution is started. There is no task to be deleted from the registration.

(CM9) Step 6740: The backup acceptance 6130 broadcasts the message 6700 indicating the new execution state of the backup requested microcomputer to the network 1000. This message 6700 contains information indicating an answer to the request for the backup; information of the task being executed by the backup requested microcomputer when the backup accepting procedure is ended; information indicating that task which is being backed up of the backup requested tasks; and the information indicating the task which is expelled from the backup requested microcomputer and has its execution halted. In response to that message, other controllers are informed of the new execution state of the backup requested microcomputer and corrects the execution sharing table, the task load table and the acceptance precedence table, which are stored in their individual memory units. In response to the message 6700, moreover, the backup requesting backup request 6120 goes out of the standby state to open the backup requesting procedure again. In the example of FIG. 10, the message 6700 presents the tasks OS22, T21, T22 and T18, which are being executed by the microcomputer 712, as the new execution situations. The task backed up is the task T18. Since there is no correspondence to the expelled tasks, it is indicated that there is no expelled task.

(CM10) The backup acceptance 6230 ends the backup accepting procedure.

Now there will be described the processing of the backup request 6120 which has its procedure reopened in response to the message 6700.

(CM11) Step 6642: The backup request 6120 extracts from the message 6700 the information identifying the task which is being backed up. Then, the backup request 6120 decides whether or not there is a task being backed up. If the answer is NO, it is decided at Step 6644 whether or not all the microcomputers have been requested for a backup. If this answer is NO, the external load precedence table is referred to at Step 6646 to select the microcomputer having a light load next to that of the present requested microcomputer as the requested microcomputer. Then, the requests for the backup are repeated again at and after Step 6620. If it is decided at Step 6644 that all the microcomputers have been requested for backup of an identical task, the backup has failed so that the degenerate means is started for the degeneration. Now, the procedure is returned to Step 6642. If there is a task backed up, the procedure advances to Step 6650.

In the example of FIG. 10, the task T18 is backed up, and the procedure advances to Step 6650.

(CM12) Step 6650: The backup request 6120 changes the execution sharing table, the task load table and the acceptance precedence table in the memory unit 6160 in accordance with the content of the message 6700. In the example of FIG. 10, the task T18 is added to the column of the task being executed by the microcomputer DC2.MC2 in the execution sharing table of FIG. 14. Likewise, in the column of the load factor, the load factor of 58% is changed to 84%. The internal load precedence of the controller 2 (DC2) is changed such that the microcomputer DC2.MC1 is changed to the second precedence; the microcomputer DC2.MC2 is changed to the fourth precedence; the microcomputer DC2.MC3 is changed to the first precedence; and the microcomputer DC2.MC4 is changed to the third precedence (although not shown). In the acceptance precedence table presented in FIG. 15, the microcomputer DC2.MC2 having the first acceptance precedence has a load factor of 84% so that it is lowered in the order, and the microcomputers having a load factor lower than 84% are raised one by one in the order. As a result, the microcomputer having the first acceptance precedence is DC3.MC1 (although not shown).

(CM13) Step 6660: The backup request 6120 deletes the task, which has been backed up as indicated by the message 6700, from the requesting task queue. On the other hand, the backup request 6120 adds the task, which has been expelled as indicated by the message 6700, to the requesting task queue. This operation is provided so that all the backups may not be ended by one backup request. Specifically, in case there is a task which has failed to be backed by a single backup or a task which has been expelled so as to raise the load factor, the tasks may be left in the requesting task queue so that they can be requested at the next time by a requested microcomputer different from the present one. In the example of FIG. 10, the task T18 is deleted from the requesting task queue so that the requesting task queue is emptied.

(CM14) Step 6670: The backup request 6120 decides whether or not a task is left in the requesting task queue. If the answer is YES, the procedure is returned again to Step 6610, at which a requested microcomputer is newly determined and requested for the backup. If no task is left in the requesting task queue, it means that all the tasks have been backed up. At this time, the backup request 6120 advances to the end of the backup requesting procedure.

(CM15) The backup request 6120 ends the backup requesting procedure.

By the Steps described above, the distributed control system according to the present embodiment autonomously distributes, if one microcomputer (DC1.MC1 ) 701 goes down, the tasks NC1, CM1 and T11 which were being executed by that microcomputer (DC1.MC1 ) 701, so that the distributed tasks may be individually backed up by the microcomputer (DC1.MC4 ) 704 of the controller 1, the microcomputer (DC1.MC3 ) 703 of the controller 1 and the microcomputer (DC2.MC2) 712 of the controller 2.

The example of FIG. 10 is described in a case where the controller having the down microcomputer and the controller requesting the backup are identical. According to the gist of the present invention, however, since the controllers 1, 2, 3 and 4 are individually equipped with execution sharing tables describing the execution states of all the controllers, in case one controller goes down, another controller can request still another controller for the backup. Specifically, in the example of FIG. 10, in place of the backup request 6120 provided by the task CM1 backed up by the microcomputer 704 of the controller 1, the backup request 6220 provided by the task CM2 being executed by the microcomputer 711 of the controller 2 can request the backup by using the execution sharing table and the acceptance precedence table, which are stored in the memory unit 6260. For this purpose, the execution sharing table, the task load table and the acceptance precedence table are stored with the states of all the controllers or all the microcomputers. In the example of FIG. 10, it is assumed that the backup request of the controller having detected the down condition will be activated.

Although the present embodiment is exemplified by a system having four controllers, the present invention can be extended to a system having two or more controllers without departing from the gist thereof. In the present embodiment, moreover, one controller is exemplified as containing four microcomputers, but the present invention can also be extended to a system having one or more processors without departing from the gist thereof.

Figure 16:
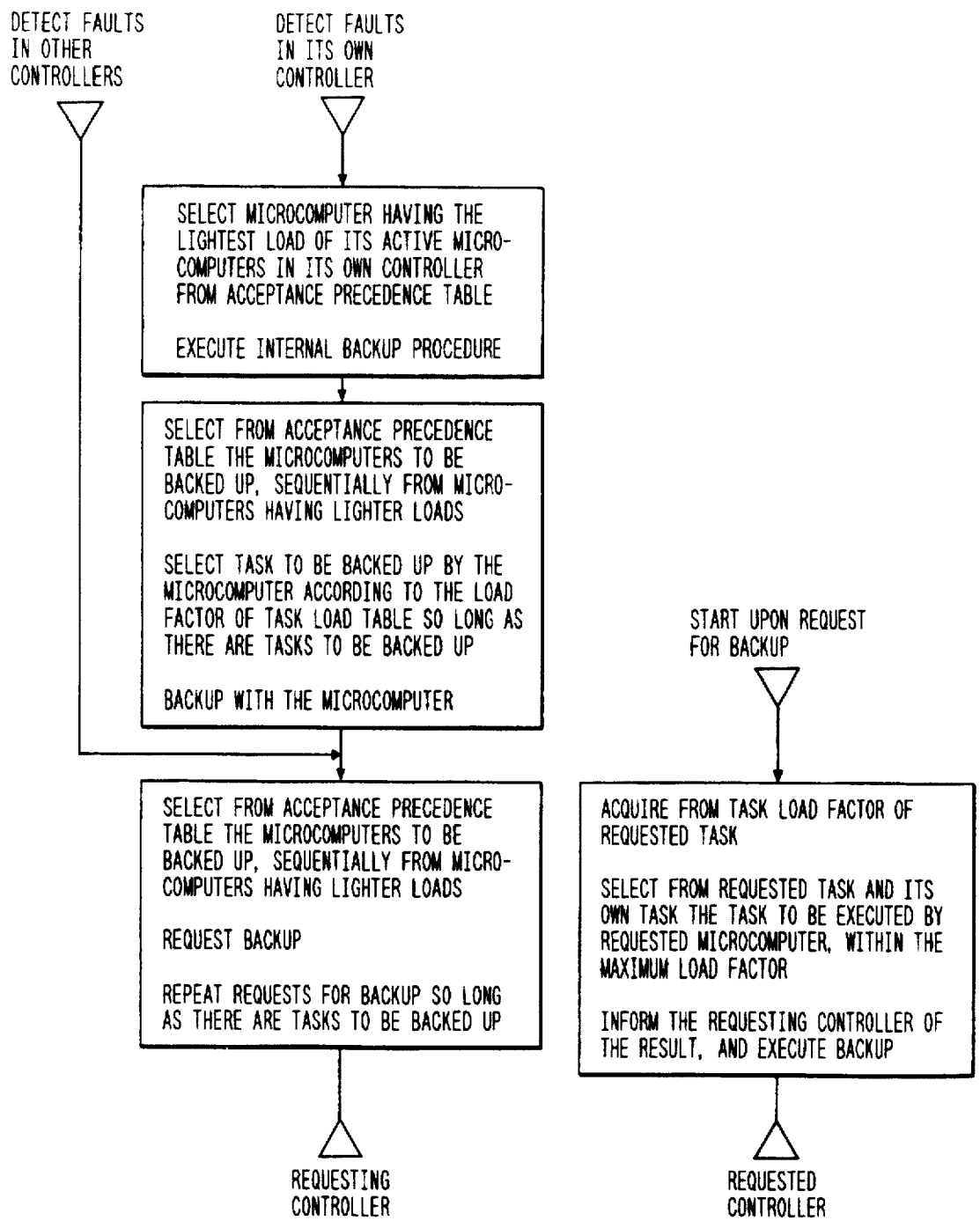
FIG. 16 is a flow chart showing the using procedures of the execution sharing table, task load table and acceptance precedence table by the backup requesting controller and the backup requested controller according to the present invention.

FIG. 16 summarizes the usage of the execution sharing table, the task load table and the acceptance precedence table by the backup requesting controller and the backup requested controller. The controller having detected its own fault starts the internal backup procedure of FIG. 2 and executes the backup from that microcomputer of its own microcomputers which has the lightest load by using the execution sharing table. At this time, the task load table is used for selecting the task to be executed. If a task to be backed up is after the backups by all the microcomputers in that controller, this controller executes the backup requesting procedure of FIG. 3. In this backup requesting procedure, the controller uses the acceptance precedence table to apply a request sequentially to controllers containing a microcomputer having the lightest load for handling the backups. The controller requested for the backup uses the task load table so as to select the task to be executed by the assigned microcomputer. The selected task is executed whereas the remaining tasks are informed to the requesting controller. The requesting controller repeats the selections of the microcomputer having the light load by using the acceptance precedence table and the requests for the backups so long as there is a task to be backed up.

Now, the aforementioned backup requesting controller has a faulty microcomputer, but it may be unable to execute the backup procedure because of the fault. In this case, the backup procedure is not executed till another controller detects that fault. Here, it is assumed that each controller is caused to inspect the validity of another controller at a proper interval. As a result, a controller which has detected a fault in another controller starts the backup procedure at Step 6605 of the backup requesting procedure. At this Step 6605, the bus 70a is opened to the faulty controller, and the task being executed by that controller is read out from the execution sharing table and is registered in the requesting task queue. The succeeding procedure is similar to that of the foregoing case in which its own fault is detected.

Figure 17:
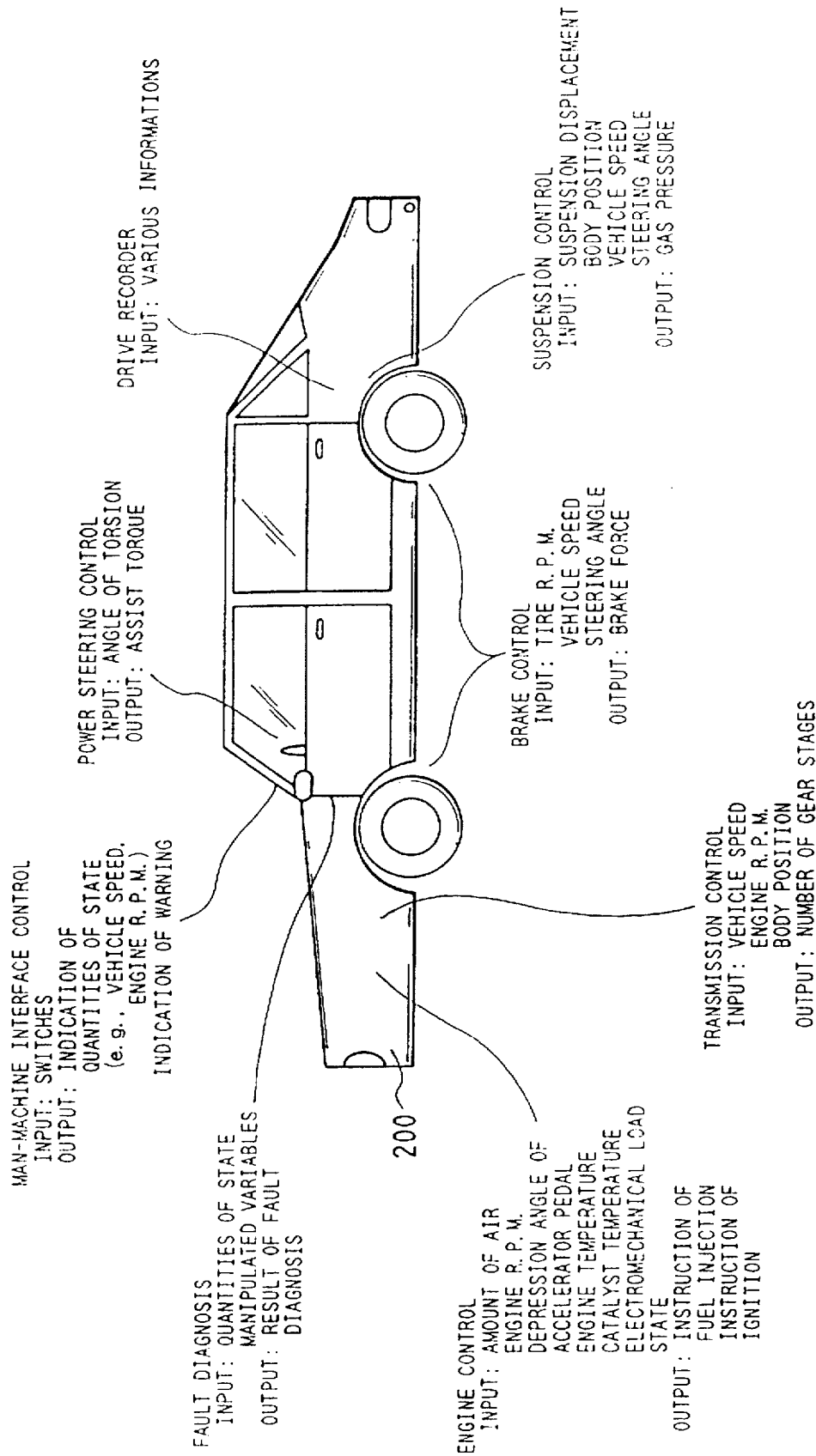
FIG. 17 is a diagram showing the control objects of an automobile.

FIGS. 17 and 18 show the controls of an automobile 200 according to an embodiment, to which is applied the distributed control system of the present invention. FIG. 17 explains the control objects of the automobile 200.

It is not desirable for an automobile, whose operation has a preformed influence on the welfare of human lives, to control such numerous objects using a single controller. This is because a fault of the controller will lead to a runaway of the system, in which the automobile cannot be controlled any more, and this may possibly cause a traffic accident. Moreover, either a number of signal lines for transmitting the states of control objects in various locations to the controller or a number of signal lines for instructing the operations to the individual control objects gather into the single controller, so that they are totally elongated, which creates design difficulties. As a result, the total weight of the signal lines is accordingly increased to undesirably increase the weight of the automobile, thereby affecting the gas mileage and cleaning the exhaust gases. It is, therefore, conceivable to distribute a plurality of controllers in the vicinity of the individual control objects so that the individual controllers may control the individual objects. According to a distributed control system thus constructed, what is lost is the control of one object, if a fault occurs, but the overall control of the automobile is not lost. Moreover, many signal lines may be connected to the control objects and the neighboring controllers so that their total weight can be reduced.

However, it is not only undesirable to lose the controls of the engine and the brake system, but also to lose the control of the steering system, such as the power steering. It is difficult from the aspect of cost to provide an alternate controller for an important controller so as to solve the problem of reliability. This is because the automobile has its space assigned preferentially to the driver and the passenger, if any, or to storage of baggage, so that the space left for a controller is severely limited. Thus, the reliability has to be improved without providing an alternate controller. Moreover, it frequently occurs that the control of each object requires the status of other control objects. For example, the speed of an automobile is used for controlling the engine, the brake system and the steering system and for indicating the speed itself. As a result, the total weight of the signal lines is still so high as to leave the problem unsolved.

For solving this problem, a suitable answer is given by the distributed control system of the present invention, in which an active controller autonomously takes charge of the load of a faulted controller. A construction of this control system is shown in FIG. 18. Now there will be described the controls to be executed by the individual controllers at first and then the charge transfer of the load through the network 1000 will be explained.

The controller 1 controls an engine 1a. This controller 1 detects the amount of air sucked into the engine cylinder, the R.P.M. and revolution angle of the engine, the depression angle of an accelerator pedal, the temperature of cooling water of the engine, and the temperature of a catalyst for cleaning the exhaust gases. In accordance with these detected values, the rate of fuel to be injected from a fuel injector is controlled to set the air/fuel ratio to a desired value in the cylinder. Specifically, the pressure to be applied to the fuel is controlled to control the injection rate. Alternatively, the fuel injection time is controlled to control the injection rate. Alternatively, the effective area of the injection port of the injector is controlled to control the injection rate. These controls may be combined to control the rate of fuel to be injected. Alternatively, only one control may be used. Moreover, the ignition timing is controlled according to the above-specified quantities. These controls enhance the engine efficiency to raise the output power. At the same time, the noxious content in the exhaust gases is reduced. Moreover, this controller 1 advances the ignition timing, if the temperature of the engine cooling water and the temperature of the exhaust cleaning catalyst are lower than the proper levels, so as to warm the cooling water and the catalyst quickly. The controller 1 is informed of the energization of head lamps and the running of an air conditioner from a controller 8 through the network 1000 so that it may open the throttle slightly to increase the engine output power so as to prevent the stalling of the engine and the fluctuation of the vehicle speed. When the vehicle speed indicated by the controller 2 through the network 1000 exceeds a predetermined value, the controller 1 reduces the fuel injection so that the vehicle speed may not exceed a predetermined value. When it is indicated from the controller 2 through the network 1000 that the gear is being changed, the controller 1 adjusts the engine output power so that the acceleration may smoothly change before and after the gear change. If the depression angle of the accelerator pedal abruptly rises, the controller 1 decides that the driver demands an abrupt acceleration. Then, the controller 1 demands the controller 8 operate to effect an interruption of the air conditioner through the network 1000 so that the engine output power being consumed by the air conditioner may be used for accelerating the vehicle. Simultaneously with this, the controller 2 is required to effect a shift-down.

The controller 2 controls a transmission 2a. This controller 2 detects the vehicle speed and compares it with a value for providing a reference to a gear change so that the gear ratio is changed according to the result of comparison. At this time, the controller 2 changes the vehicle speed for the reference to the gear change in accordance with the throttle opening and the engine R.P.M. indicated from the controller 1 through the network 1000 and the vehicle body position indicated from the controller 3. When the throttle opening is small but the engine R.P.M. is high, for example, the output loss increases due to the resistance to the suction. Thus, the vehicle speed for the reference to the gear change is lowered so that the gear is shifted up at a low speed to drop the engine R.P.M. If the body position is inclined backward, it is decided that the vehicle is running on a rising slope. Then, the reference vehicle speed for a shift-up is raised so that the climbing power is maintained by using a lower-speed gear.

The controller 3 controls a suspension 3a. This controller 3 detects the displacement of the suspension and the vehicle body position and receives the vehicle speed from the controller 2 and the steering angle from a controller 5 through the network 1000 so that the pressure in the pneumatic spring of the suspension is accordingly controlled to achieve the desired vehicle body position. This controller 3 identifies the vehicle body position to other controllers through the network 1000.

The controller 4 controls a brake 4a. This controller 4 detects the R.P.M. of the tires and receives the vehicle speed from the controller 2 and the steering angle from the controller 5 through the network 1000. In accordance with these values, the controller 4 determines the slip factor of the tires with respect to the road surface and decides the braking force to be applied such that the slip factor may be less than a predetermined value. Moreover, the controller 4 applies a light braking force to the inner wheels at the time of turning to ensure a smooth turn.

The controller 5 controls a power steering system 5a. This controller 5 detects the angle of torsion of the steering shaft and adjusts the assist torque of the power steering such that the angle of torsion may decrease. Moreover, the controller 5 detects the steering angle and informs other controllers of this information through the network 1000.

A controller 6 diagnoses a fault. This controller 6 detects a fault or degradation of another controller or a control object device by comparing the quantities of state or the manipulated variables, sent from other controllers through the network 1000, with its own simulation results. If the controller 6 detects a fault or degradation, it informs a controller 8 of the result of fault diagnosis. If a fault of another controller is detected, the foregoing backup requesting procedure of FIG. 2 is started.

A controller 7 is a drive recorder for storing the history of the operations of the vehicle, which are communicated through the network 1000, in a memory unit 7a which is resistant to impact or heat.

The controller 8 controls the man-machine interface, such as a switch 8a, a meter 8b or a display 8c. The controller 8 operates or halts, when the driver operates the switch 8a, a corresponding unit in response to the ON/OFF condition of the switch 8a. Moreover, the quantities of state, such as the vehicle speed or the engine R.P.M. or the results of fault diagnosis informed through the network 1000, are indicated in the meter 8b or on the display 8c. Moreover, the controller 8 turns ON/OFF the various units in response to a request or demand fed from another controller through the network 1000.

Thus, the individual controllers inform each other of the quantities of state communicated through the network 1000, the control outputs or the operation requests, and control their own devices in accordance with the quantities of state, the control outputs and the operation requests. The transfer of the quantities of state between the controllers is carried out through the network 1000, having as few as two signal lines, thus solving the aforementioned problem of the high weight of the signal lines.

Now there will be described the autonomous backup through the network 1000. If each controller detects its own fault or a fault of another controller, the backup of the load of the faulty controller is started according to the backup procedure, as shown in FIGS. 2, 3 and 4. This backup procedure will not be described here because its detailed operations have already been described. In order to complete this backup, the sum of margins of the individual controllers has to be higher than the load to be backed up. In the distributed control system for controlling a plurality of kinds of control objects by a plurality of controllers, generally speaking, the system has different states for the maximum loads of the individual controllers. It is, therefore, thought that the plurality of controllers have margins necessary for the backups as a whole.

This situation will be described in connection with the automobile 200. The load upon each controller varies with the driving situation of the automobile 200. For example, the controller 1 for controlling the engine 1a has its load factor raised when the engine 1a revolves at a high speed and lowered when at a medium speed. The load factor is generally proportional to the R.P.M. of the engine 1a, but is raised at an idling time having the lowest speed so as to effectively execute the processing for preventing the engine from stalling and the processing for cleaning the exhaust gases. On the other hand, the load factor of the controller 2 for controlling the transmission 2a is raised when the vehicle speed highly changes. Especially at an acceleration time, the load factor is high because the number of times of calculation of the reference speed for the gear change increases. At a normal cruising time, on the contrary, the load factor decreases. Moreover, since the controller 4 for controlling the brake 4a executes the processing for preventing the tires from slipping only when the brake pedal is depressed, its load factor is extremely low while the brake pedal is not depressed. Thus, the running states of the automobile 200 for the load factors of the individual controllers to rise are different for different control objects, so that some of the controllers have such low load factors that they can back up the loads of other controllers. In other words, a specific controller always has a low load factor, but controllers having low load factors interchange according to the running situation of the automobile 200. In this control system of the automobile 200, a controller for backing up the load of a faulty controller is selected according to the load factor by the backup procedure, as shown in FIGS. 2, 3 and 4.

According to the present invention, still moreover, even against a multiple failure of the controllers of the distributed control system, the load can be autonomously distributed among and backed up by the active controllers. Thus, it is possible to enhance the reliability and the fault tolerance.

What is claimed is:

1. A distributed control system comprising a plurality of controllers each having a plurality of tasks to be executed, for controlling said controllers in a distributed manner,
   wherein each of said controllers includes detect means for detecting a fault or overload condition of another controller; memory means for detecting and storing information indicating a priority and a load factor of each task of said controllers; and backup means for distributing tasks of a faulty or overloaded controller, when a fault or overload condition is detected by said detect means and the faulty or overloaded controller is specified, to at least one controller selected to serve as a backup controller, a distributing of respective said tasks being decided in accordance with both priorities and load factors indicated in said memory means.

2. A distributed control system according to claim 1, wherein said backup means assigns the tasks of a faulty or overloaded controller, when the tasks of said faulty or overloaded controller are to be backed up by a backup controller, to at least one backup controller such that predetermined amounts of loads or tasks of backup controllers may not be exceeded.

3. A distributed control system according to claim 1, wherein said backup means assigns the tasks of a faulty or overloaded controller, when the tasks of said faulty or overloaded controller are to be backed up by a backup controller, to at least one backup controller selected in an order starting from a controller having a smallest amount of load or task of said plurality of controllers.

4. A distributed control system according to claim 1, wherein said backup means assigns the tasks of a faulty or overloaded controller, when the tasks of said faulty or overloaded controller are to be backed up by a backup controller, to at least one backup controller having a smallest amount of load or task of said plurality of controllers.

5. A distributed control system wherein said plurality of controllers according to claim 1 include an engine control controller, a transmission control controller and a brake control controller.

6. A distributed controller comprising a plurality of processors each having a plurality of tasks to be executed, for controlling said processors in a distributed manner,
   wherein each of said processors includes detect means for detecting a fault or overload condition of a predetermined processor; memory means for detecting and storing information indicating a priority and a load factor of each task of said processors; and backup means for distributing tasks of a faulty or overloaded processor, when a fault or overload condition is detected by said detect means and the faulty or overloaded processor is specified, to at least one processor selected to serve as a backup processor, a distributing of respective said tasks being decided in accordance with both priorities and load factors indicated in said memory means.

7. A distributed control system according to claim 6, wherein said backup means assigns the tasks of a faulty or overloaded processor, when the tasks of said faulty or overloaded processor is to be backed up by a backup processor, to at least one backup processors such that predetermined amounts of loads or tasks of backup processors may not be exceeded.

8. A distributed control system according to claim 4, wherein said backup means assigns the tasks of a faulty or overloaded processor, when the tasks of said faulty or overloaded processor are to be backed up by a backup processor, to at least one backup processor selected in the order starting from a processor having a smallest amount of load or task of said plurality of controllers.

9. A distributed control system according to claim 6, wherein said backup means assigns the tasks of a faulty or overloaded processor, when the tasks of said faulty or overloaded processor are to be backed up by a backup processor, to at least one backup processor having a smallest amount of load or task of said plurality of processors.

10. A distributed control system comprising a plurality of controllers according to claim 5 and each having a plurality of tasks to be executed, for controlling said controllers in a distributed manner,
    wherein each of said controllers includes controlling detect means for detecting a fault or overload condition of another controller; controller memory means for detecting and storing information indicating a priority and a load factor of each task of said controllers; and controller backup means for distributing tasks of a faulty or overloaded controller, when a fault or overload condition is detected by said controller detect means and the faulty or overloaded controller is specified, to at least one controller selected to serve as a backup controller, distributing of respective said tasks of said faulty or overloaded controller being decided in accordance with the priorities and load factors indicated in said controller memory means.

11. A distributed control system wherein said plurality of controllers according to claim 10 include an engine control controller, a transmission control controller and a brake control controller.

12. A distributed controller to be controlled through a network, comprising: detect/transmit means for detecting a fault or overload condition of said distributed controller and an amount of load of said distributed controller and for transmitting information indicating a detected amount of load to another distributed controller through said network; and request means for sending a message requesting that the load of said distributed controller be borne by said another distributed controller through said network, wherein if said detect/transmit means detects a fault or overload condition of said distributed controller, the amount of load of said distributed controller at this time is included in a message sent by said request means to be borne by said another distributed controller, and wherein each of said distributed controller and said another distributed controller comprise memory means for storing information indicating a priority and a load factor of each task of said distributed controller, and a distributing of tasks of said distributed controller is decided in accordance with both priorities and load factors indicated in said memory means.

13. A distributed controller according to claim 12, wherein said request means includes accept means for accepting an answer from said another distributed controller which was requested by said request means to bear the load of said distributed controller, wherein if said answer indicates that the requested load has been only partially borne in said another distributed controller, still another distributed controller is requested to bear the remaining load in a message sent through said network by said request means.

14. A distributed controller according to claim 12, wherein said request means assigns the load of said distributed controller to said other distributed controller to said other distributed controllers connected therewith through said network in the order from the distributed controller having a smallest amount of load of said other distributed controllers.

15. A distributed controller connected with another distributed controller through a network, wherein said another distributed controller includes:

detect/transmit means for detecting a fault or overload condition of said another distributed controller and an amount of load of said another distributed controller and for transmitting information indicating said detected load to distributed controller through said network; and request means for sending a message through said network requesting that the load of said another distributed controller be borne by said distributed controller, and wherein said distributed controller includes: detect means for detecting an amount of load of said distributed controller; accept means for accepting information indicating an amount of load from said detect/transmit means and a request from said request means in said another distributed controller; arithmetic means for determining an amount of load to be backed up in said another distributed controller, from the amount of load of said distributed controller detected by said detect means and the amount of load indicated by information accepted by said accept means; and transmit means for transmitting information indicating an amount of load requested, which cannot be processed by said distributed controller, to said another distributed controller; and wherein each of said distributed controller and said another distributed controller comprise memory means for storing information indicating a priority and a load factor of each task of said another distributed controller, and said amount of load requested which cannot be processed and a distributing of tasks of said another distributed controller is decided in accordance with a result of calculation by said arithmetic means and in accordance with both priorities and load factors indicated in said memory means.

16. A distributed control system comprising: a plurality of distributed controllers; and a network connecting said distributed controllers wherein each of said distributed controllers includes: memory means for storing information indicating a priority and a load factor of each task of said distributed controllers; detect/transmit means for detecting a fault or overload condition and an amount of load and for transmitting information indicating said detected load to another distributed controller through said network;

request means for sending a message through said network requesting said load be borne by said another distributed controller; accept means for accepting information indicating an amount of load from the detect/transmit means of said another distributed controller and a request from said request means of said another distributed controller; arithmetic means for determining an amount of load to be backed up, from the amount of load detected by said detect/transmit means and the amount of load indicated by information accepted by said accept means; and transmit means for transmitting information indicating an amount of load requested, which cannot be processed, to said another distributed controller which has requested backup, wherein said amount of load which cannot be processed and a distribution of tasks of said another distributed controller is decided in accordance with a result of calculation by said arithmetic means and in accordance with both priorities and load factors indicated in said memory means.

17. A distributed control system according to claim 16, wherein if an answer from the transmit means of distributed controller which has requested backup indicates that the load is partially borne or that the load requested to be borne and the load of the requested controller are to be interchanged, distributed controllers other than that requested to bear the load are requested to bear the remaining load rejected or the interchanged load.

18. An automobile control system for controlling a plurality of microcomputers, wherein said plurality of microcomputers are connected through a network, and each of said microcomputers comprises memory means for storing information indicating a priority and a load factor of each task of said plurality of microcomputers, said system comprising: means for transmitting status information concerning an automobile parameter detected by a first microcomputer to a second microcomputer through said network, wherein said second microcomputer includes means for controlling control objects connected therewith by using said status information, and wherein, if said first microcomputer is faulty, at least one of said plurality of microcomputers takes over the processing of tasks of said first microcomputer and operates to transmit said status information necessary for the processing of said second microcomputer through said network so that the control of said control objects by said second microcomputer may be continued, a distributing of respective said tasks of said first microcomputers being decided in accordance with both priorities and load factors indicated in said memory means.

19. An automobile control system for controlling a plurality of automobile controllers through a network, each controller of said plurality of controllers comprising a plurality of microcomputers and, memory means for storing information indicating a priority and a load factor of each task of said plurality of microcomputers: said system comprising: means for transmitting status information concerning an automobile parameter detected by a first automobile controller to a second automobile controller through said network, wherein said second automobile controller includes means for controlling the control objects connected therewith by using said status information, and wherein, if said first automobile controller is faulty, at least one of said plurality of automobile controllers takes over the processing of said first automobile controller and operates to transmit said status information necessary for the processing of said second automobile controller through said network so that the control of said control objects by said second automobile controller may be continued, a distributing of respective said tasks of said first microcomputers being decided in accordance with both priorities and load factors indicated in said memory means.

20. A distributed control system comprising a plurality of controllers each having a plurality of tasks to be executed, for controlling said controllers in a distributed manner, wherein each of said controllers includes four microcomputers, detect means for detecting a fault or overload condition of another controller; memory means for detecting and storing information indicating a priority and a load factor of each task of said controllers, and also for storing an execution sharing table assigning an attribute to each task to indicate whether or not such task need be distributed and backed-up by a nonfaulty controller in the event of a faulty or overloaded condition; and backup means for distributing tasks of a faulty or overloaded controller, when a fault or overload condition is detected by said detect means and the faulty or overloaded controller is specified, to at least one controller selected to serve as a backup controller, a distributing of respective said tasks being decided in accordance with both priorities and load factors, and also said execution sharing table indicated in said memory means.

21. A distributed control system comprising a plurality of controllers each having a plurality of tasks to be executed, for controlling said controllers in a distributed manner, wherein each of said controllers includes detect means for detecting a fault or overload condition of another controller; memory means for detecting and storing information indicating a controller domicile of each task being executed, kinds of tasks and load factor for each task of said controllers; and backup means for distributing tasks of a faulty or overload controller, when a fault or overload condition is detected by said detect means and the faulty or overload controller is specified, to at least one controller selected to serve as a backup controller, a distributing of respective said tasks being decided in accordance with said controller domicile of each task, kinds of tasks and load factors indicated in said memory means.

\* \* \* \* \*